(12) United States Patent
Acreman et al.

(10) Patent No.: US 11,340,492 B1
(45) Date of Patent: May 24, 2022

(54) LIQUID CRYSTAL GRADIENT-INDEX LENS STRUCTURE WITH IMPROVED TRANSITION REGION

(71) Applicant: SHARP KABUSHIKI KAISHA, Sakai (JP)

(72) Inventors: Andrew Acreman, Oxford (GB); Nathan James Smith, Oxford (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/217,212

(22) Filed: Mar. 30, 2021

(51) Int. Cl.
  *G02F 1/1335* (2006.01)
  *G02F 1/1333* (2006.01)
  *G02F 1/1337* (2006.01)
  *G02F 1/29* (2006.01)

(52) U.S. Cl.
  CPC .. *G02F 1/133526* (2013.01); *G02F 1/133345* (2013.01); *G02F 1/133354* (2021.01); *G02F 1/133788* (2013.01); *G02F 1/294* (2021.01); *G02F 2201/121* (2013.01); *G02F 2201/122* (2013.01)

(58) Field of Classification Search
  None
  See application file for complete search history.

(56) References Cited

U.S. PATENT DOCUMENTS

| | | | | |
|---|---|---|---|---|
| 7,375,784 | B2* | 5/2008 | Smith | G02F 1/133753 349/129 |
| 2012/0188490 | A1* | 7/2012 | Zohrabyan | G02B 27/64 349/96 |
| 2012/0307169 | A1* | 12/2012 | Ohyama | G02B 30/28 349/33 |
| 2014/0049682 | A1* | 2/2014 | Galstian | G02F 1/133784 348/356 |
| 2017/0010517 | A1* | 1/2017 | Lin | G02F 1/133345 |
| 2017/0269453 | A1* | 9/2017 | Galstian | G02F 1/29 |
| 2018/0031947 | A1* | 2/2018 | Shibuya | G02F 1/29 |

* cited by examiner

*Primary Examiner* — Ryan Crockett
(74) *Attorney, Agent, or Firm* — ScienBiziP, P.C.

(57) ABSTRACT

A liquid crystal (LC) lens structure may include first and second electrode substrates, and an LC layer disposed between the first and second electrode substrates, where each of the first and second electrode substrates include an associated LC alignment layer. The LC lens structure may also include a first lens region and a second lens region separated from the first lens region by an intermediate region. The LC lens structure may also include a first electrode layer having first electrodes segmented into two or more separately addressed electrodes for each of the first and second lens regions. In some examples, an electrical insulation layer may be disposed between the first electrode layer and a second electrode layer including a second electrode positioned within the intermediate region. In other examples, the LC layer may include a polymer wall extending from at least one LC alignment layer in the intermediate region.

15 Claims, 32 Drawing Sheets

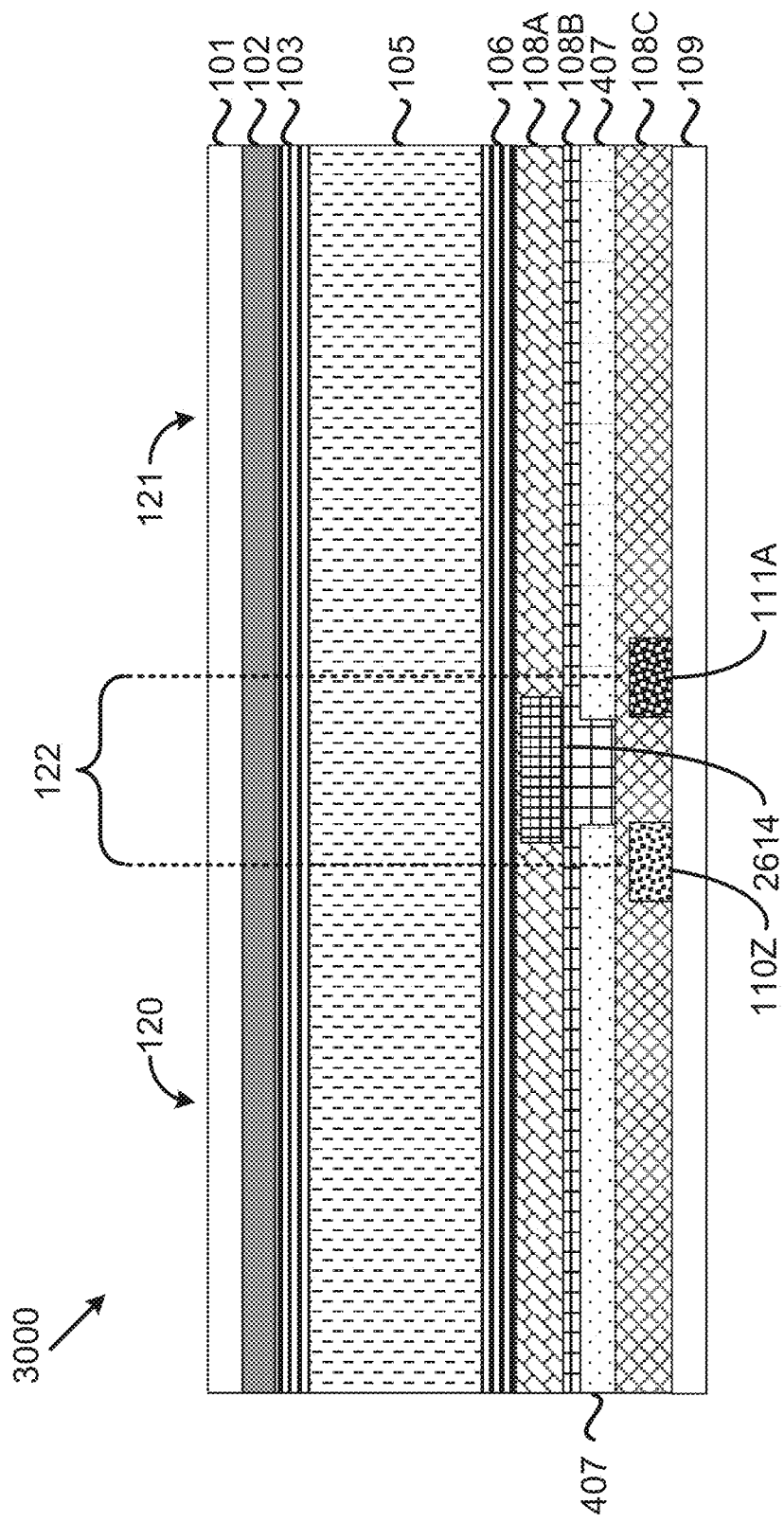

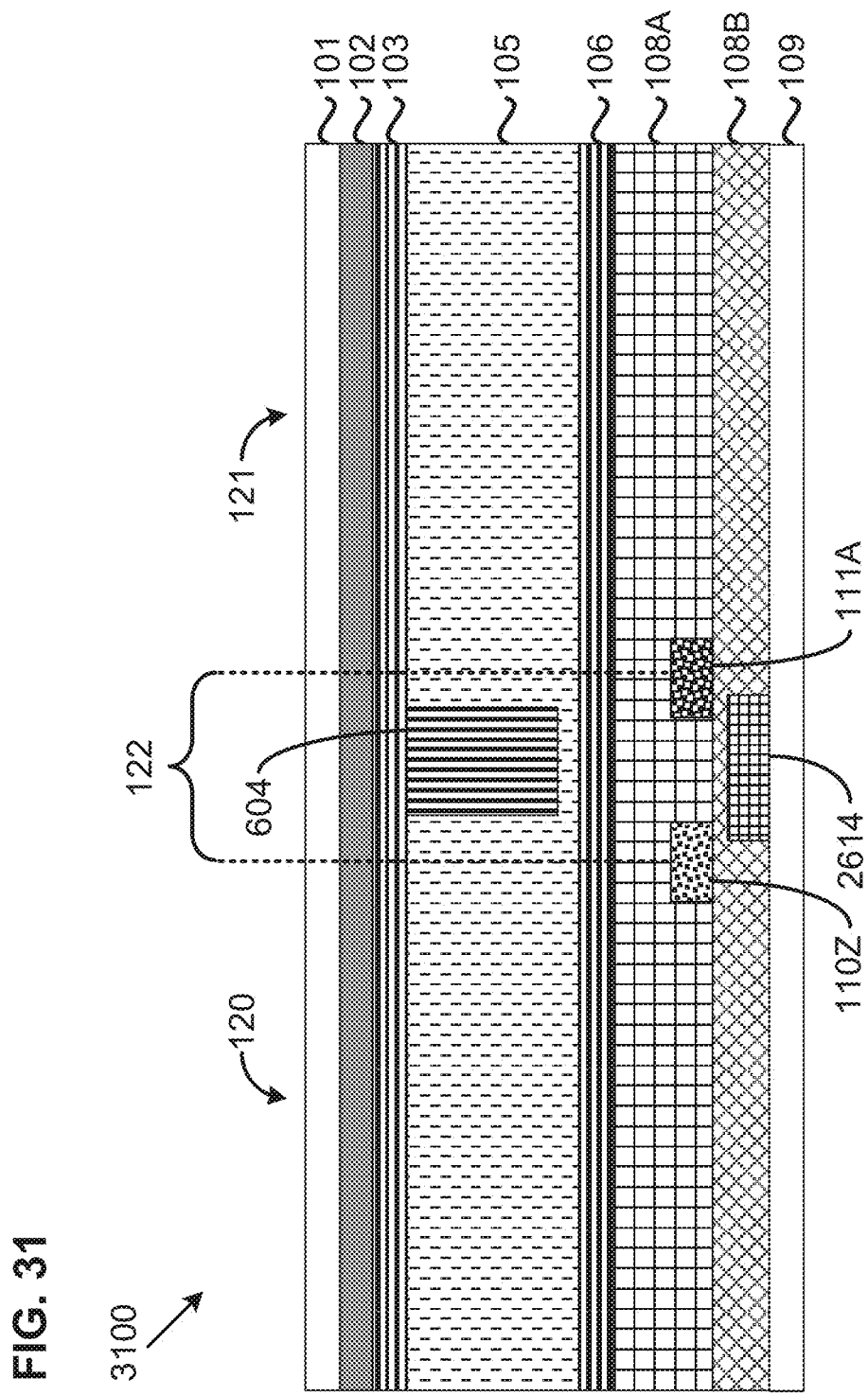

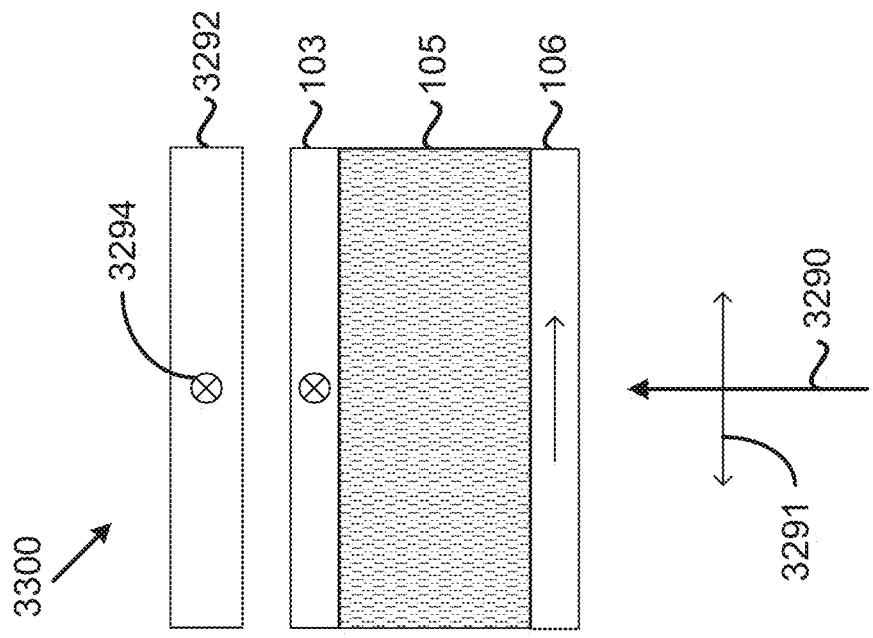
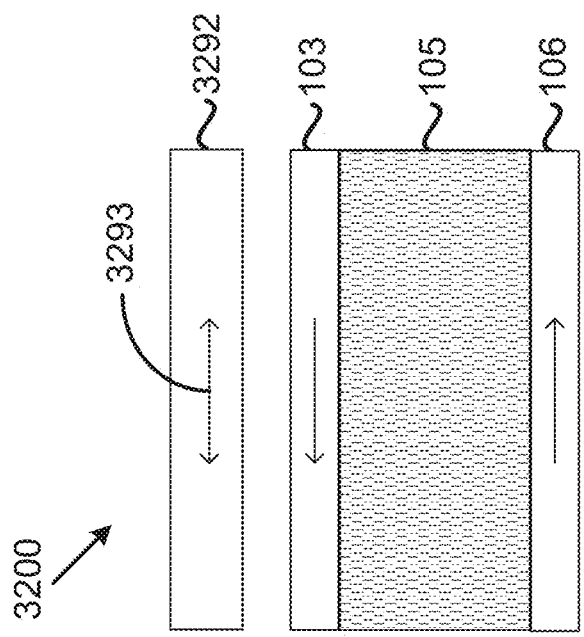

LIQUID CRYSTAL GRADIENT-INDEX LENS STRUCTURE WITH IMPROVED TRANSITION REGION

FIELD

The present disclosure generally relates to lens structures, and in particular relates to liquid crystal (LC) gradient-index (GRIN) lens structures providing improved transition regions between separate focusing regions or zones, where liquid crystals within each transition region are efficiently realigned between neighboring focusing regions.

BACKGROUND

Generally, a GRIN lens provides a non-constant refractive index arranged according to a gradient along at least one dimension orthogonal to an optical axis of the lens. For example, the refractive index of a GRIN lens may vary (e.g., parabolically) according to a radial distance from the optical axis of the lens, thus allowing a GRIN lens with opposing planar surfaces to perform as a standard spherical or cylindrical lens (e.g., a planoconvex lens, a biconvex lens, a planoconcave lens, a biconcave lens, and so on), thus allowing a GRIN lens to be narrower and lighter compared to a standard lens.

Additionally, an LC GRIN lens, by way of one or more voltages applied across a liquid crystal medium, may produce the desired optical phase gradient while providing the added benefit of allowing the focal length or optical power of the LC GRIN to be altered or tuned (e.g., by modifying the applied voltages). More specifically, the orientation of the liquid crystals may correspond to the magnitude of the electric field to which the liquid crystals are exposed, as determined by the magnitude of the voltage across the corresponding region of the LC medium.

In some cases, an LC GRIN lens may employ separate zones or regions to generate the desired refractive index gradient at different locations of the lens. As discussed more fully below, neighboring operating regions of an LC GRIN lens may be separated by an intermediate region or "transition region" to facilitate reorientation of the liquid crystals from an ending boundary of one operating region to a starting boundary of a subsequent operating region. Efficient reorientation of the liquid crystals, resulting in minimizing the size of the transition regions, is considered critical to the performance of the lens.

SUMMARY

The present disclosure is directed to an LC GRIN lens structure with an improved transition region.

In accordance with one aspect of the present disclosure, an LC lens structure includes a first electrode substrate, a second electrode substrate disposed over the first electrode substrate, and an LC layer disposed between the first electrode substrate and the second electrode substrate. The LC lens structure further includes a first lens region and a second lens region separated from the first lens region by an intermediate region. The second electrode substrate includes a top substrate, a transparent conductive layer, and a first LC alignment layer. The first electrode substrate includes a bottom substrate, a second LC alignment layer, a first electrode layer including a plurality of first electrodes, a second electrode layer including a second electrode, and an electrical insulation layer disposed between the first electrode layer and the second electrode layer. The first electrodes are segmented into two or more individually addressed electrodes for each of the first lens region and the second lens region, and the second electrode is positioned within the intermediate region.

In an implementation of the first aspect, the second electrode layer is located between the first electrode layer and the LC layer. In another implementation of the first aspect, the first electrode layer is located between the second electrode layer and the LC layer.

In yet another implementation of the first aspect, the first electrode substrate further includes an insulation layer and a high resistance layer disposed between the insulation layer and the LC layer. The insulation layer isolates the high resistance layer from the plurality of first electrodes and the second electrode. The high resistance layer is patterned such that a first portion of the high resistance layer in the first lens region is electrically separated from a second portion of the high resistance layer in the second lens region.

In yet another implementation of the first aspect, the LC layer, in the intermediate region, further includes a polymer wall in contact with at least one of the first LC alignment layer and the second LC alignment layer.

In yet another implementation of the first aspect, the first LC alignment layer and the second LC alignment layer are configured to facilitate an LC mode selected from a group consisting of an electrically controlled birefringence (ECB) LC mode, a twisted nematic (TN) LC mode, a vertically aligned nematic (VAN) LC mode, and a twisted vertically aligned nematic (VAN) LC mode.

In accordance with a second aspect of the present disclosure, an LC lens structure includes a first electrode substrate, a second electrode substrate disposed over the first electrode substrate, and an LC layer disposed between the first electrode substrate and the second electrode substrate. The LC lens structure includes a first lens region and a second lens region separated from the first lens region by an intermediate region. The second electrode substrate includes a top substrate, a transparent conductive layer and a first LC alignment layer. The first electrode substrate includes a bottom substrate, a second LC alignment layer, and an electrode layer including a plurality of electrodes. The plurality of electrodes are separated into two or more separately addressed electrodes for each of the first lens region and the second lens region. The LC layer, in the intermediate region, further includes a polymer wall extending from at least one of the first LC alignment layer and the second LC alignment layer.

In an implementation of the second aspect, a height of the polymer wall is less than a height of the LC layer and is in contact with the second electrode substrate.

In an implementation of the second aspect, a width of the polymer wall is less than a distance between a final electrode of the plurality of electrodes in the first lens region closest to the intermediate region and an initial electrode of the plurality of electrodes in the second lens region closest to the intermediate region. In another implementation of the second aspect, a width of the polymer wall is greater than a distance between a final electrode of the plurality of electrodes in the first lens region closest to the intermediate region and an initial electrode of the plurality of electrodes in the second lens region closest to the intermediate region.

In yet another implementation of the second aspect, the polymer wall is positioned equidistant from a final electrode of the plurality of electrodes in the first lens region closest to the intermediate region to an initial electrode of the plurality of electrodes in the second lens region closest to the intermediate region. In another implementation of the second aspect, the polymer wall is offset from a midpoint of a distance between a final electrode of the plurality of electrodes in the first lens region closest to the intermediate region and an initial electrode of the plurality of electrodes in the second lens region closest to the intermediate region.

In another implementation of the second aspect, the polymer wall has a symmetric shape. In yet another implementation of the second aspect, the polymer wall has an asymmetric shape.

In another implementation of the second aspect, the polymer wall is optically isotropic. In yet another implementation of the second aspect, the polymer wall is optically birefringent.

In another implementation of the second aspect, the plurality of electrodes are apportioned to a lower layer and an upper layer disposed between the LC layer and the lower layer. The first electrode substrate further includes an insulation layer separating the lower layer and the upper layer, and the plurality of electrodes are positioned such that electrodes immediately neighboring each electrode in the upper layer reside in the lower layer. The plurality of electrodes are sized such that each electrode in the upper layer overlaps each immediately neighboring electrode in the lower layer.

In yet another implementation of the second aspect, the first electrode substrate further includes an insulation layer and a high resistance layer disposed between the insulation layer and the LC layer. The insulation layer isolates the high resistance layer from the plurality of electrodes. The high resistance layer is patterned such that a first portion of the high resistance layer in the first lens region is electrically separated from a second portion of the high resistance layer in the second lens region. In some examples, the high resistance layer is patterned such that a width of a gap between the first portion of the high resistance layer and the second portion of the high resistance layer is greater than a width of the polymer wall. In other examples, the high resistance layer is patterned such that a width of a gap between the first portion of the high resistance layer and the second portion of the high resistance layer is equal to a width of the polymer wall. In yet other examples, the high resistance layer is patterned such that a width of a gap between the first portion of the high resistance layer and the second portion of the high resistance layer is less than a width of the polymer wall.

In yet another implementation of the second aspect, the first LC alignment layer and the second LC alignment layer are configured to facilitate an LC mode selected from a group consisting of an electrically controlled birefringence (ECB) LC mode, a twisted nematic (TN) LC mode, a vertically aligned nematic (VAN) LC mode, and a twisted vertically aligned nematic (VAN) LC mode.

BRIEF DESCRIPTION OF DRAWINGS

Aspects of the example disclosure are best understood from the following detailed description when read with the accompanying figures. Various features are not drawn to scale. Dimensions of various features may be arbitrarily increased or reduced for clarity of discussion.

FIGS. 26-30 are cross-sectional views of portions of various LC GRIN lens structures employing a transition electrode corresponding to a transition region, in accordance with example implementations of the present disclosure.

FIG. 31 is a cross-sectional view of an LC GRIN lens structure employing a polymer wall and a transition electrode corresponding to a transition region, in accordance with an example implementation of the present disclosure.

FIG. 32 is a partial cross-sectional view of an electrically controlled birefringence (ECB) LC GRIN lens structure, in accordance with an example embodiment of the invention.

FIG. 33 is a partial cross-sectional view of a twisted nematic (TN) LC GRIN lens structure, in accordance with an example embodiment of the invention.

DESCRIPTION

Figure 1:
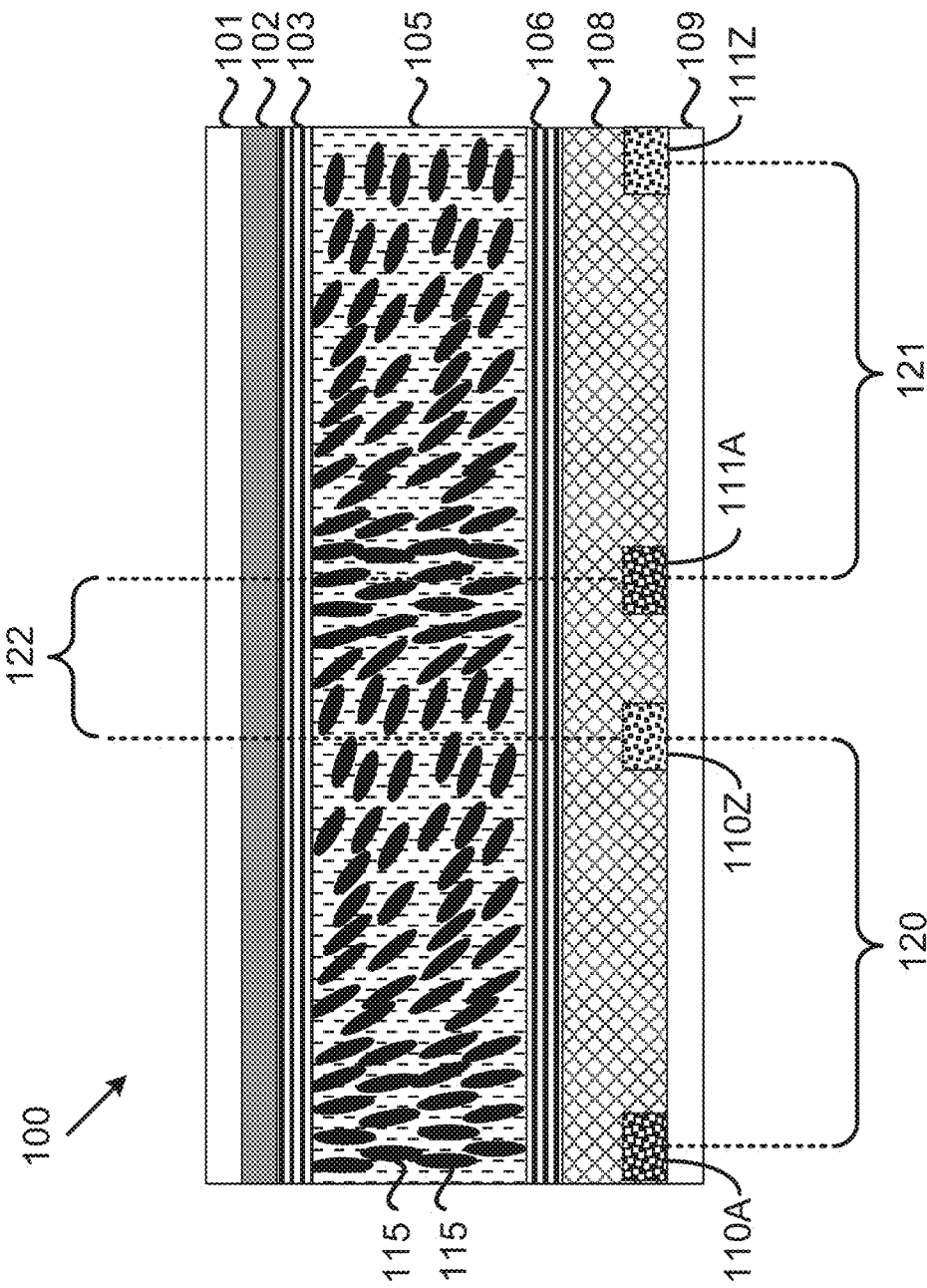
FIGS. 1-5 are cross-sectional views of portions of various LC GRIN lens structures, in accordance with related art LC GRIN lenses.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore will not be narrowly confined to what is shown in the figures.

The phrases "in one implementation" and "in some implementations" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series, and equivalent.

Additionally, any two or more of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behavior, term, or claim described in the following disclosure may be implemented independently and separately to form a specific method. Dependency, e.g., "according to", "more specifically", "preferably", "in one embodiment", "in one implementation", "In one alternative", etc., in the following disclosure refers to just one possible example which would not restrict the specific method.

For explanation and non-limitation, specific details, such as functional entities, techniques, protocols, and standards, are set forth for providing an understanding of the described technology. In other examples, detailed description of well-known methods, technologies, systems, and architectures are omitted so as not to obscure the description with unnecessary details.

Also, while certain directional references (e.g., top, bottom, up, down, height, width, and so on) are employed in the description below and appended claims, such references are utilized to provide guidance regarding the positioning and dimensions of various elements relative to each other and are not intended to limit the orientation of the various embodiments to those explicitly discussed herein.

FIG. 1 is a cross-sectional view of a portion of an LC GRIN lens structure 100 in accordance with a related art LC GRIN lens structure. As shown, LC GRIN lens structure 100 may include an LC layer 105 carrying liquid crystals 115, wherein LC layer 105 is contained by a top LC alignment layer 103 and a bottom LC alignment layer 106, which may serve to align liquid crystals 115 in a particular orientation in the absence or near-absence of a voltage applied across LC layer 105, as described in greater detail below. Bounding LC GRIN lens structure 100 is a top substrate 101 and a bottom substrate 109 that may protect the remaining components of LC GRIN lens structure 100 from external elements and forces.

As indicated above, an LC GRIN lens may employ separate zones or regions to generate the desired refractive index gradient at different locations of the lens. For example, in the case of a spherical LC GRIN lens, a central circular region through which the optical axis of the lens extends may be surrounded by several concentric ring-shaped regions that may decrease in radial thickness such that the refractive index gradient provided by each ring increases with the radius of the ring. In some examples, the radial thickness of the regions may range from one or two millimeters to tens of micrometers.

To facilitate these regions, as further illustrated in FIG. 1, a common electrode 102 resides between top substrate 101 and top LC alignment layer 103. Further, a first electrode 110A and a last electrode 110Z (collectively, electrodes 110) defining a first region 120, as well as a first electrode 111A and a last electrode 111Z (collectively, electrodes 111) defining a second region 121 of LC GRIN lens structure 100 are laid atop bottom substrate 109 and may be encased within an insulator layer 108 insulating electrodes 110 and 111 from bottom LC alignment layer 106 and each other. In some embodiments, insulator layer 108 may be omitted. While additional regions may also be implemented in LC GRIN lens structure 100, only first region 120 and second region 121 are shown in FIG. 1 to simplify the following discussion. While common electrode 102 is shown as extending continuously across first region 120, second region 121, and other portions therebetween, common electrode 102 may be segmented into multiple common electrodes 102 in other examples. In some embodiments, top substrate 101, common electrode 102, and top LC alignment layer 103 may be referred to as a first or top electrode substrate. Further, bottom LC alignment layer 106, bottom substrate 109, and various electrodes 110 and 111, as well as other components or layers residing between bottom LC alignment layer 106 and bottom substrate 109, may be referred to as a second or bottom electrode substrate.

Operation of LC GRIN lens structure 100, which occurs by way of applying voltages to electrodes 110 of first region 120 and electrodes 111 of second region 121, may be dependent on the particular LC technology upon which LC GRIN lens structure 100 is based. For example, for an electronically controlled birefringent (ECB)-type LC GRIN lens with a negative focal power (e.g., a diverging lens), a first voltage (e.g., a relatively high voltage, such as 2 volts (V), 5 V, 10 V, or 20 V) may be applied across first electrode 110A and common electrode 102 in first region 120, as well as across first electrode 111A and common electrode 102 in second region 121, which may cause alignment of liquid crystals 115 in a particular direction (e.g., somewhat parallel to the electric field produced between first electrode 110A and common electrode 102 in the case of a +ve dielectric material). Also, a second voltage (e.g., a relatively low voltage, such as 0 V or 1 V) may be applied across last electrode 110Z and common electrode 102 in first region 120, as well as across last electrode 111Z and common electrode 102 in second region 121, which may cause alignment of liquid crystals 115 in a different direction (e.g., somewhat parallel to top LC alignment layer 103 and bottom LC alignment layer 106). In some embodiments, negative voltages (e.g., −10 V, −20 V, and so on) may also be applied to electrodes 110 and 111. In some cases, corresponding electrodes of first region 120 and second region 121 (e.g., first electrodes 110A and 111A) may be coupled together such that the same voltage is applied to those corresponding electrodes, as described above. In other examples, each electrode of first region 120 and second region 121 may be individually addressable, thus allowing a different voltage to be applied thereto relative to other electrodes.

In the case of an ECB-type LC GRIN lens with a positive focal power (e.g., a converging lens), a first voltage (e.g., a relatively low voltage, such as 0 V or 1 V) may be applied across first electrode 110A and common electrode 102 in first region 120, as well as across first electrode 111A and common electrode 102 in second region 121, which may cause alignment of liquid crystals 115 in a particular direction (e.g., somewhat parallel to top LC alignment layer 103 and bottom LC alignment layer 106). Also, a second voltage (e.g., a relatively high voltage, such as 2 V, 5 V, 10 V, or 20 V) may be applied across last electrode 110Z and common electrode 102 in first region 120, as well as across last electrode 111Z and common electrode 102 in second region 121, which may cause alignment of liquid crystals 115 in a different direction (e.g., somewhat parallel to the electric field produced between first electrode 110A and common electrode 102 if a +ve material is employed). One of ordinary skill in the art would understand how this may be applied to other types of LC GRIN lenses, such as vertically aligned (VA) or twisted nematic (TN) LC GRIN lenses.

In some examples, a strength of the electric field within LC layer 105 between first electrode 110A and last electrode 110Z of first region 120 may progressively weaken. Similarly, a strength of the electric field between first electrode 111A and last electrode 111Z of second region 121 may progressively weaken. As such, a progressive change in alignment of liquid crystals 115, and correspondingly the observed refractive index and optical "phase" of the light, may be produced within these regions. Such progressive change in liquid crystal 115 alignment may result in an associated progressively changing refractive index within each of first region 120 and second region 121.

As shown in FIG. 1, between first region 120 and second region 121 is a transition region 122, the boundaries of which may be defined by the distance between the points of maximum and minimum phase between two neighboring lens regions (e.g., first region 120 and second region 121). This distance may roughly correspond to the distance between a midpoint of each of the last electrode of a region (e.g., electrode 110Z of first region 120) and the first electrode of a subsequent region (e.g., first electrode 111A of second region 121). Due to the finite size of transition region 122 and the response of liquid crystals 115 therewithin, the resulting refractive index will exhibit a continuous change within transition region 122, as opposed to a discontinuous change, which would be optically ideal. Further, in some examples, the alignment of liquid crystals 115 may not be able to exhibit the same steep gradient as the electric field imposed by electrodes 110 and 111, thus possibly causing an enlarged effective transition region 122 (e.g., larger than indicated in FIG. 1). Embodiments discussed further below may counteract these effects, thereby reducing or minimizing the size of transition region 122.

In some embodiments, various components of LC GRIN lens structure 100 described above may be transparent to visible light, or substantially so, to allow visible light to pass therethrough. Transparent components may particularly include top substrate 101, common electrode 102, top LC alignment layer 103, LC layer 105, bottom LC alignment layer 106, insulator layer 108, and bottom substrate 109. In some examples, electrodes 110 and 111 may have similar properties as common electrode 102, which may be manufactured from indium tin oxide (ITO) or another substantially transparent conductor material.

Figure 2:
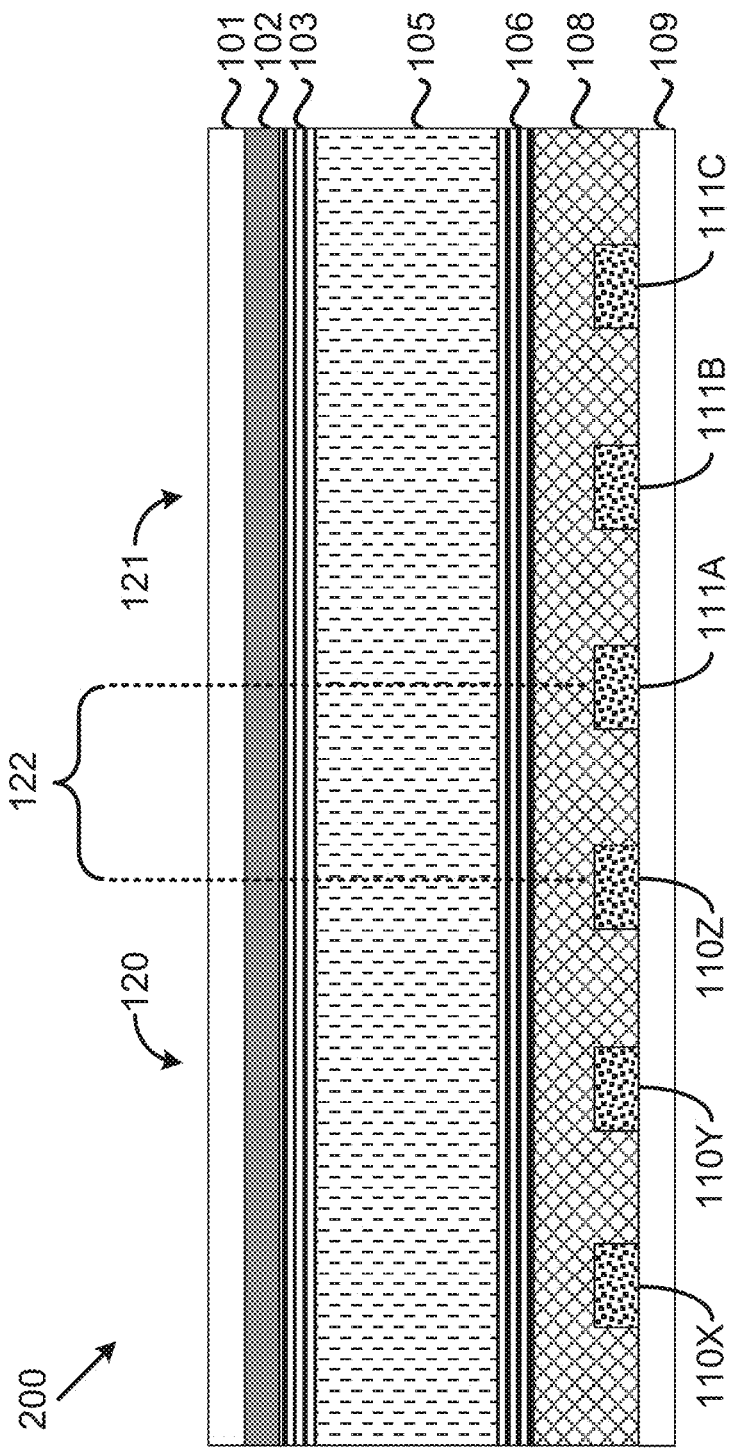

Other conventional LC GRIN lens structures may exhibit similar transition regions to that of LC GRIN lens structure 100. For example, FIG. 2 is a cross-sectional view of a portion of another related art LC GRIN lens structure 200 that employs LC layer 105, as well as the other layers and components described above in conjunction with FIG. 1. (Also included, but not explicitly depicted in FIG. 2 and the remaining drawings provided herein, are liquid crystals 115.) Unlike LC GRIN lens structure 100 of FIG. 1, LC GRIN lens structure 200 includes more than two electrodes for each region 120 and 121. Shown in FIG. 2 are a last set of electrodes 110X, 110Y, and 110Z of first region 120 followed by a first set of electrodes 111A, 111B, and 111C of second region 121. While FIG. 2 may imply the existence of 26 individual electrodes 110 and 111 per region 120 and 121 (e.g., electrodes 110A (not shown in FIG. 2), 110B (also not shown in FIG. 2), . . . 110X, 110Y, and 110Z of first region 120), greater or fewer numbers of electrodes 110 and 111 may be present. Also, in some examples, a different number of electrodes 110 may be employed in first region 120 compared to the number of electrodes 111 in second region 121.

In operation, a different voltage may be applied across each electrode 110 and common electrode 102 of LC GRIN lens structure 200 to create an electric field gradient and corresponding optical phase gradient that is more linear across first region 120, and a similar set of voltages may be applied across electrodes 111 of second region 121 and common electrode 102. In some embodiments, corresponding electrodes of first region 120 and second region 121 (e.g., first electrodes 110A and 111A, second electrodes 110B and 111B, and so on) may be coupled together such that the same voltage is applied to those corresponding electrodes, as described above. In other examples, each electrode of first region 120 and second region 121 may be individually addressable, thus allowing a different voltage to be applied thereto relative to other electrodes in the same region or other regions.

As before, a significant difference in voltage between last electrode 110Z of first region 120 and first electrode 111A of second region 121 may be present in transition region 122, in a manner similar to that described above for LC GRIN lens structure 100. As discussed above, this voltage difference and associate electric field gradient may be difficult for the orientation of liquid crystals 115 to change at the same rate. Embodiments described in greater detail below may reduce or minimize the size of transition region 122, thus increasing optical performance.

Figure 3:
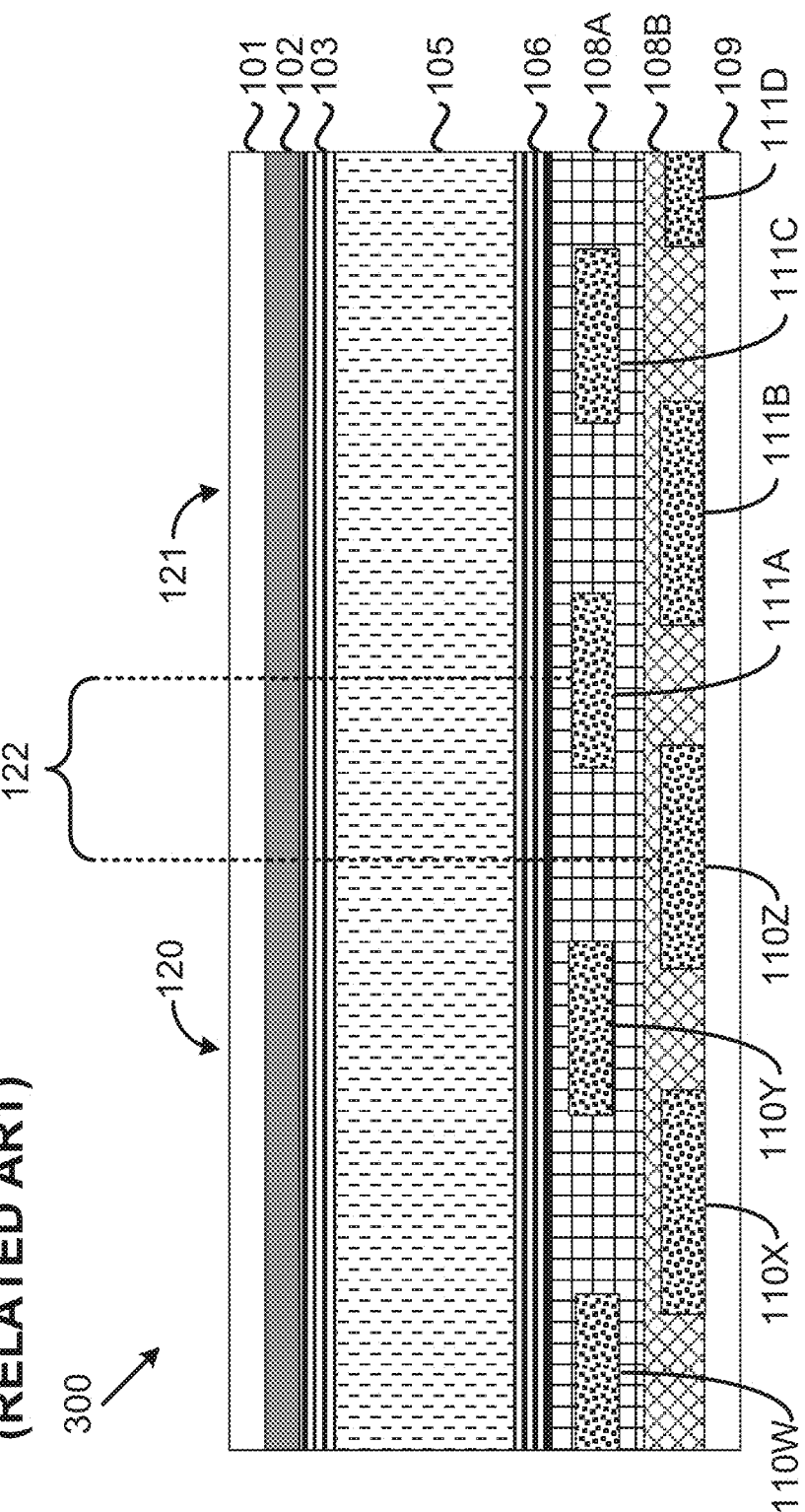

FIG. 3 is a cross-sectional view of a portion of another related art LC GRIN lens structure 300 that employs LC layer 105, as well as the other layers and components described above in conjunction with FIGS. 1 and 2. To provide a more linear profile for the electric field produced through LC layer 105, the location of the last set of electrodes 110W, 110X, 110Y, and 110Z of first region 120 and first set of electrodes 111A, 111B, 111C, and 111D of second region 121 may alternate between two separate rows or levels between bottom LC alignment layer 106 and bottom substrate 109 such that the electrodes may partially overlap. Such a configuration may facilitate a more linear gradient in voltage and associated electric field through first region 120 and second region 121 than that discussed above for LC GRIN lens structure 200 due to more potential overlap in electric fields provided by neighboring electrodes 110 or 111. In yet other examples, three or more separate rows of electrodes may be employed; however, such examples may rarely provide a significant performance advantage to justify potential increases in cost and manufacturing complexity.

As shown in FIG. 3, a first group of electrodes (e.g., electrodes 110X and 110Z of first region 120 and electrodes 111B and 111D of second region 121) may be located in a first row atop bottom substrate 109 and encased in an intermediate insulator layer 108B. A second group of electrodes (e.g., electrodes 110W and 110Y of first region 120 and electrodes 111A and 111C of second region 121) may be located in a second row and encased in a top insulator layer 108A over intermediate insulator layer 108B. In some embodiments, top insulator layer 108A and intermediate insulator layer 108B may include the same insulator material or different insulator materials. Also, in some examples, top insulator layer 108A and intermediate insulator layer 108B may be deposited separately (e.g., after their associated electrodes 110 and 111 have been placed). In some embodiments, top insulator layer 108A may be omitted. As before, the close relative proximity of last electrode 110Z of first region 120 and first electrode 111A of second region 121 may generate a high electric field gradient that may be difficult for the optical phase or orientation of liquid crystals 115 (shown in FIG. 1) to follow.

Figure 4:
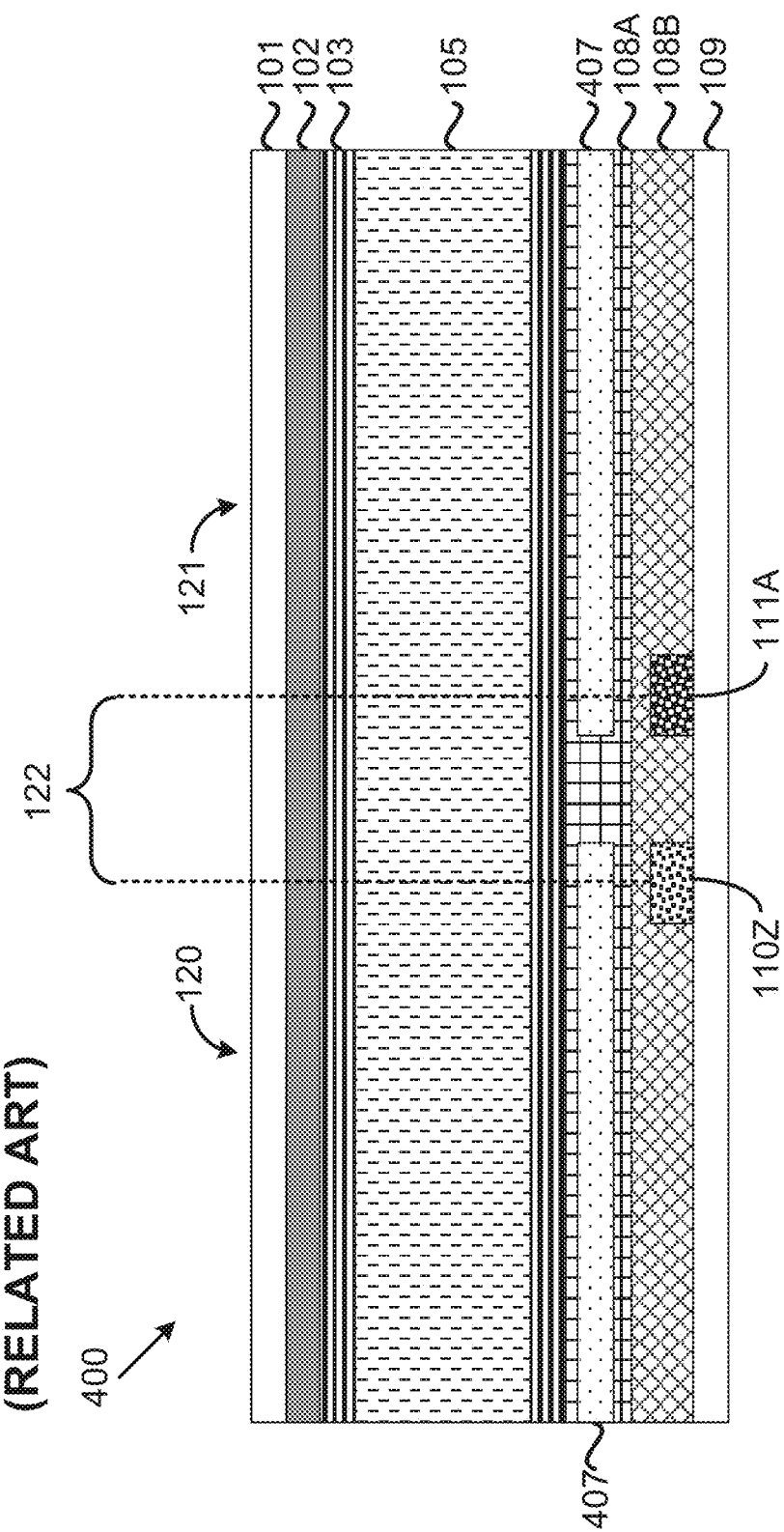

FIG. 4 is a cross-sectional view of a portion of another related art LC GRIN lens structure 400 that incorporates a high-resistance layer 407 for each of first region 120 and second region 121. In this particular example, first region 120 has first electrode 110A (not shown in FIG. 4) and last electrode 110Z, while second region 121 includes first electrode 111A and last electrode 111Z (also not shown in FIG. 4). High-resistance layer 407 may be positioned in top insulator layer 108A, thereby encasing each high-resistance layer 407 instead of a row of electrodes, as depicted in FIG. 3. In some embodiments, high-resistance layer 407 may extend in a contiguous manner from first electrode 110A to last electrode 110Z, and in a separate contiguous manner from first electrode 111A to last electrode 111Z, with a gap in high-resistance layer 407 located in transition region 122. In some examples, high-resistance layer 407 may include a semiconductor material. Also, while FIG. 4 shows high-resistance layer 407 as isolated from electrodes 110 and 111, each portion of high-resistance layer 407 may be connected to electrodes 110 and 111 (e.g., one portion of high-resistance layer 407 may be connected to first electrode 110A and last electrode 110Z of first region 120, while another portion of high-resistance layer 407 may be connected to first electrode 111A and last electrode 111Z of second region 121), such as by way of conductive vias extending through top insulator layer 108A and intermediate insulator layer 108B. Further, in some embodiments, high-resistance layer 407 may be coupled to each electrode 110 and 111 by way of omitting either or both top insulator layer 108A and intermediate insulator layer 108B (e.g., using a single insulator layer 108, with high-resistance layer 407 laying across each electrode 110 and 111 of each corresponding region 120 and 121.

In operation, use of high-resistance layer 407 may cause some averaging of the electric fields generated by the voltage across each electrode 110 and 111 and common electrode 102 to produce an overall electric field with a smoother or more linear gradient than what may be possible with LC GRIN lens structure 100 of FIG. 1. As with the other examples presented above, a large difference in voltage and associated electric field difference between last electrode 110Z of first region 120 and first electrode 111A of second region 121 may make proper reorientation of liquid crystals 115 in LC layer 105 within a narrow transition region 122 difficult.

Figure 5:
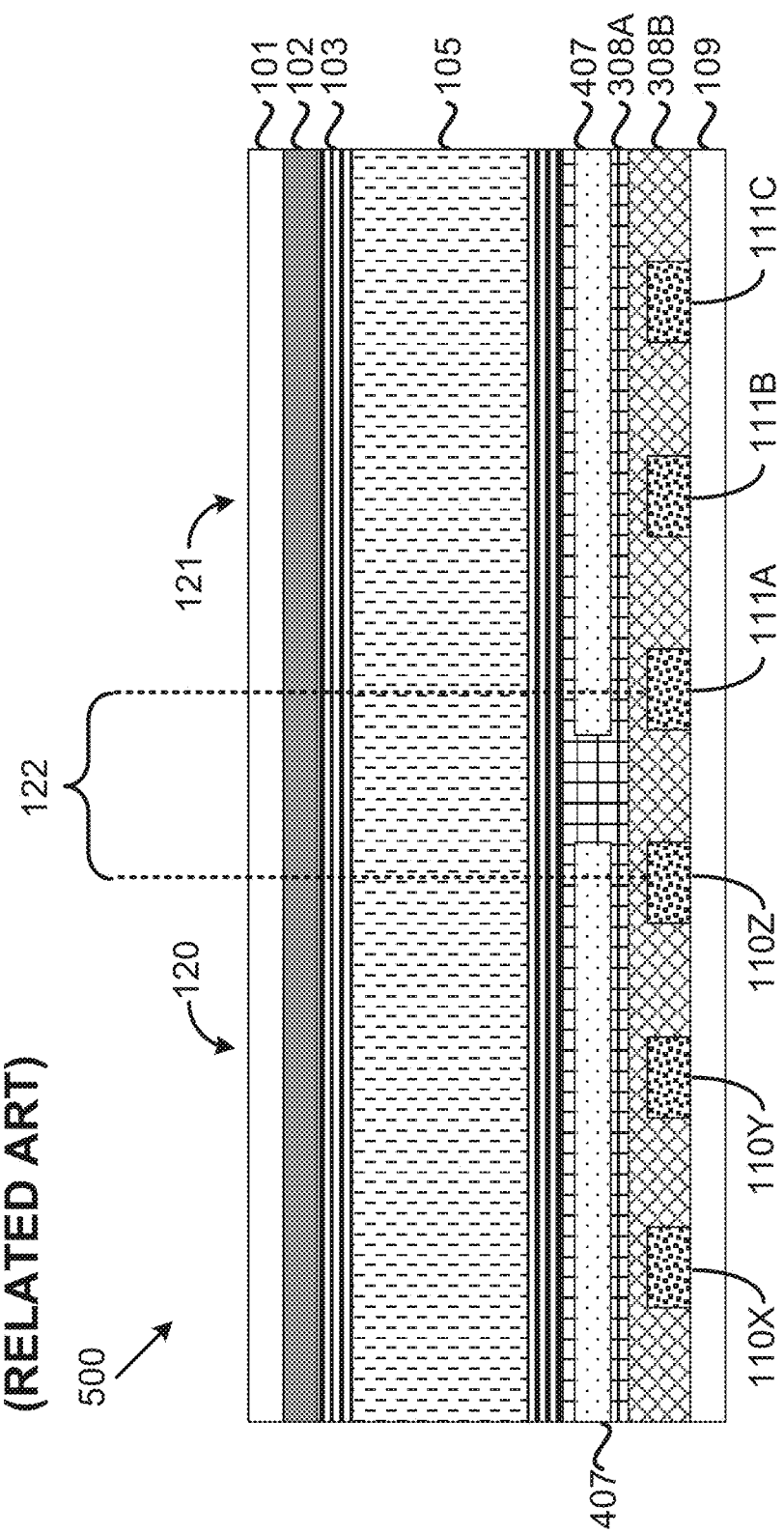

FIG. 5 is a cross-sectional view of a portion of another LC GRIN lens structure 500 that incorporates high-resistance layer 407 for each of first region 120 and second region 121, where first region 120 is shown as including a last set of electrodes 110X, 110Y, and 110Z, and where second region 121 is depicted with a first set of electrodes 111A, 111B, and 111C, in a manner similar to FIG. 2. In this configuration, high-resistance layer 407 may serve to merge the electric field potentials of neighboring electrodes 110 of first region 120, as well as merge the electric field potentials of neighboring electrodes 111 of second region 121. A possible advantage of this configuration over that shown in FIG. 3 for LC GRIN lens structure 300 is that while high-resistance layer 407, as employed in LC GRIN lens structure 400 of FIG. 4, is sufficient to provide a linear voltage gradient between a first and last electrode of a region (e.g., first electrode 110A and last electrode 110Z of first region 120), this will only produce the desired approximately linear optical phase gradient if the voltages are such that the liquid crystal electrooptical response is substantially linear. Limiting the voltages of the device in such a manner limits the maximum optical phase gradient and consequently the maximum focal power of a lens. LC GRIN lens structure 500 of FIG. 5 overcomes this limitation, as the multiple electrodes 110 and 111 can be used to correct for a nonlinear liquid crystal electrooptical response. While not shown, one of ordinary skill in the art would understand that high-resistance layer 407 may also be incorporated in the multilayer electrode configuration of LC GRIN lens structure 300 of FIG. 3.

Figure 6:
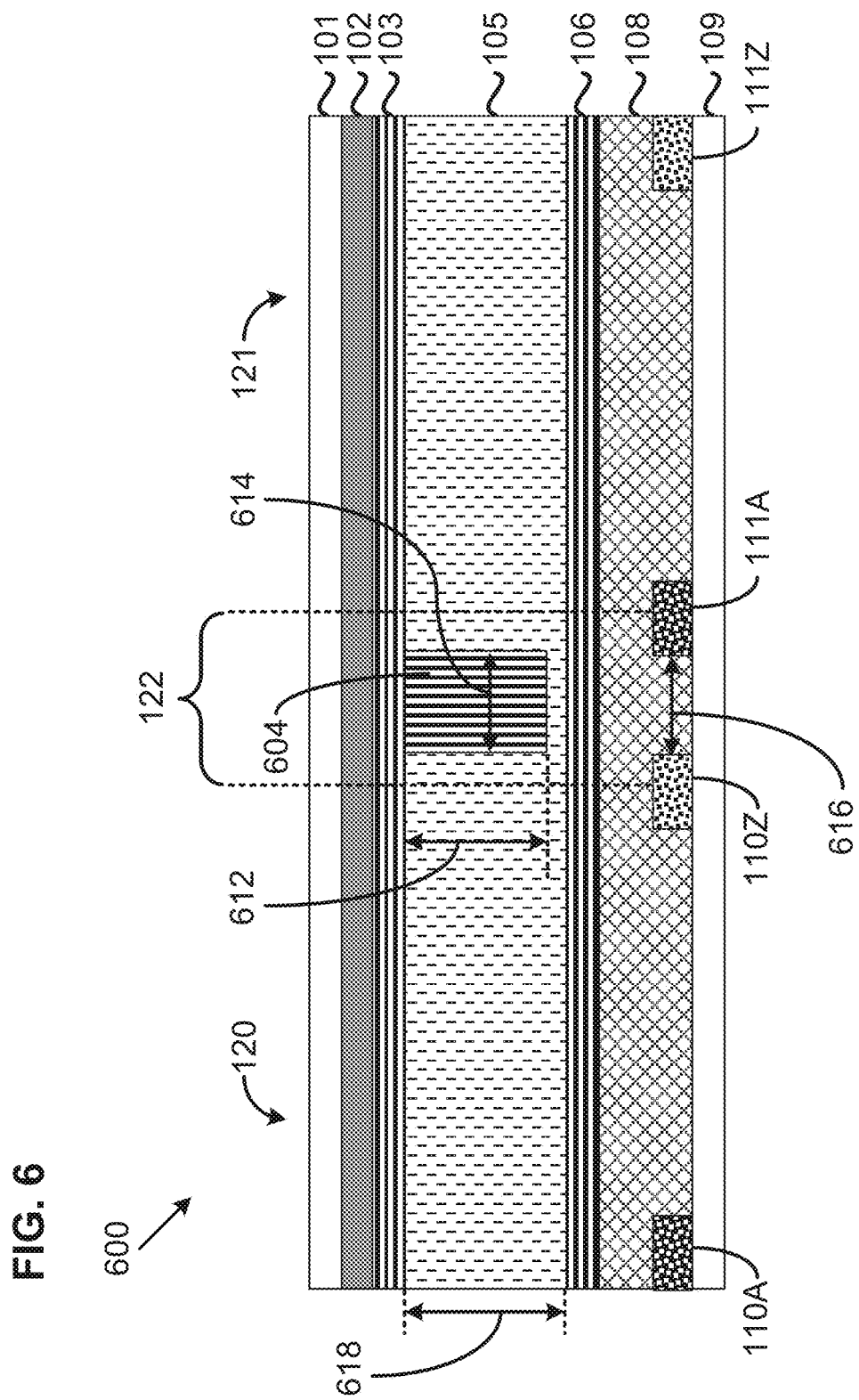
FIGS. 6-10 are cross-sectional views of portions of various LC GRIN lens structures employing a polymer wall centered in a transition region, in accordance with example implementations of the present disclosure.
Figure 7:
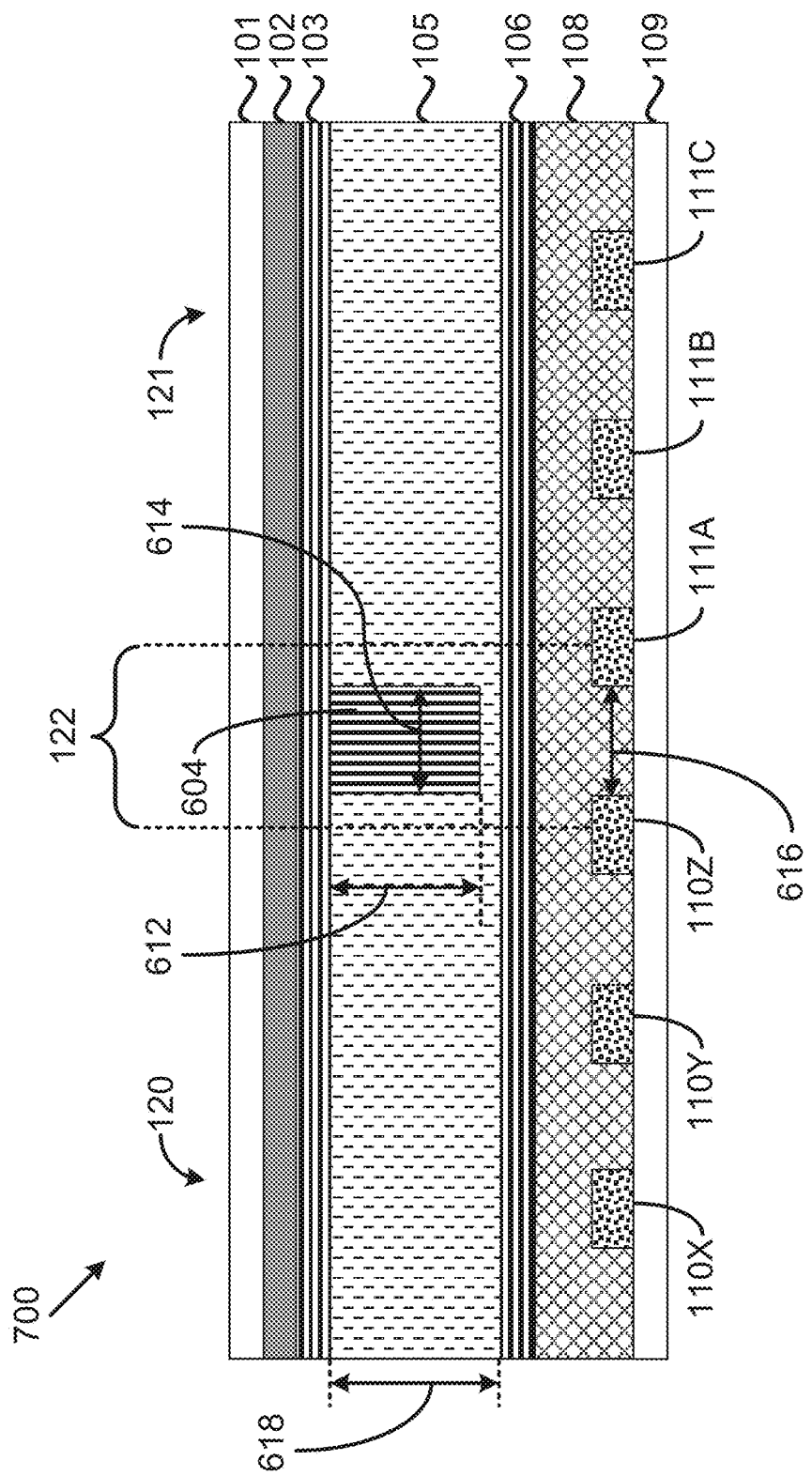
Figure 8:
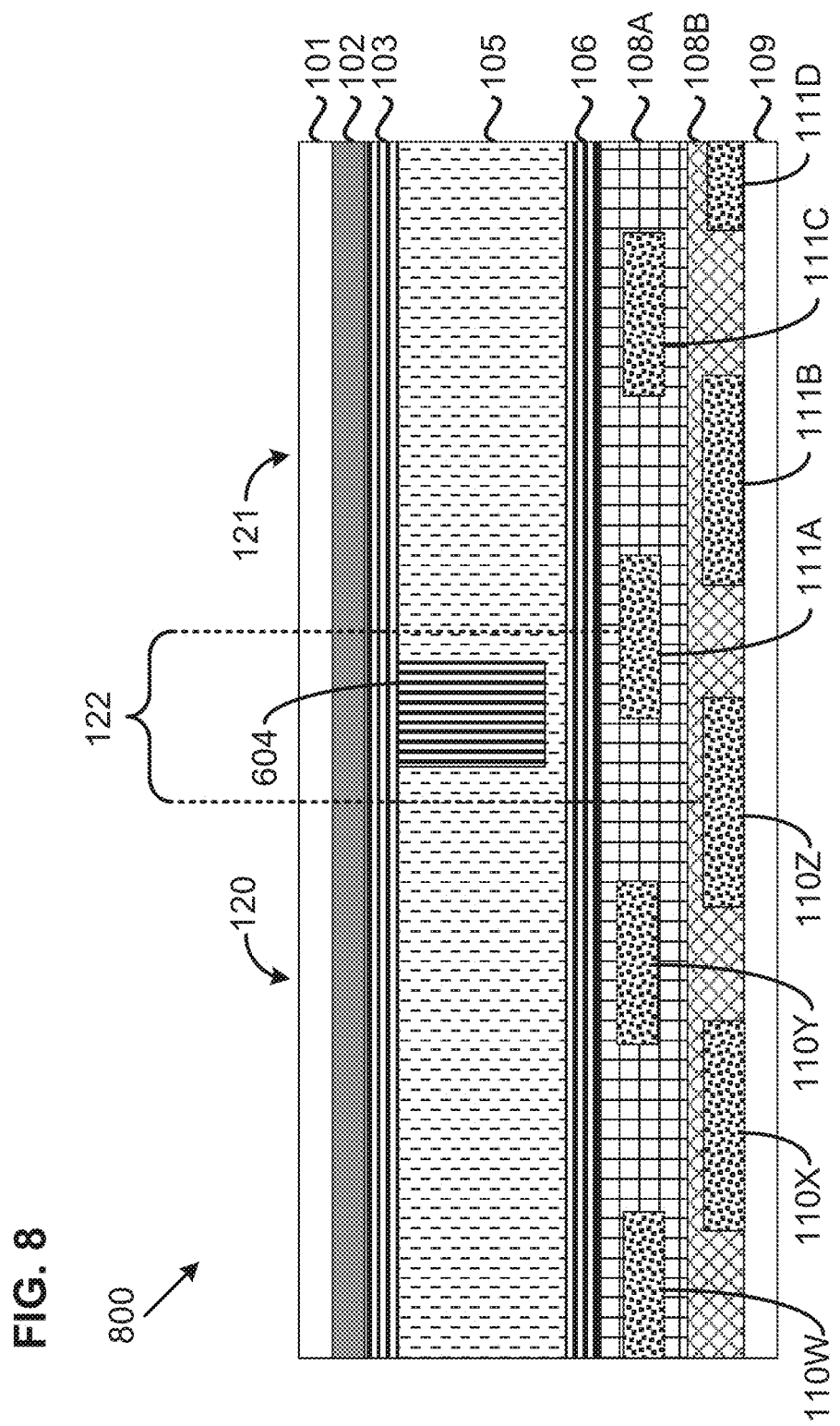
Figure 9:
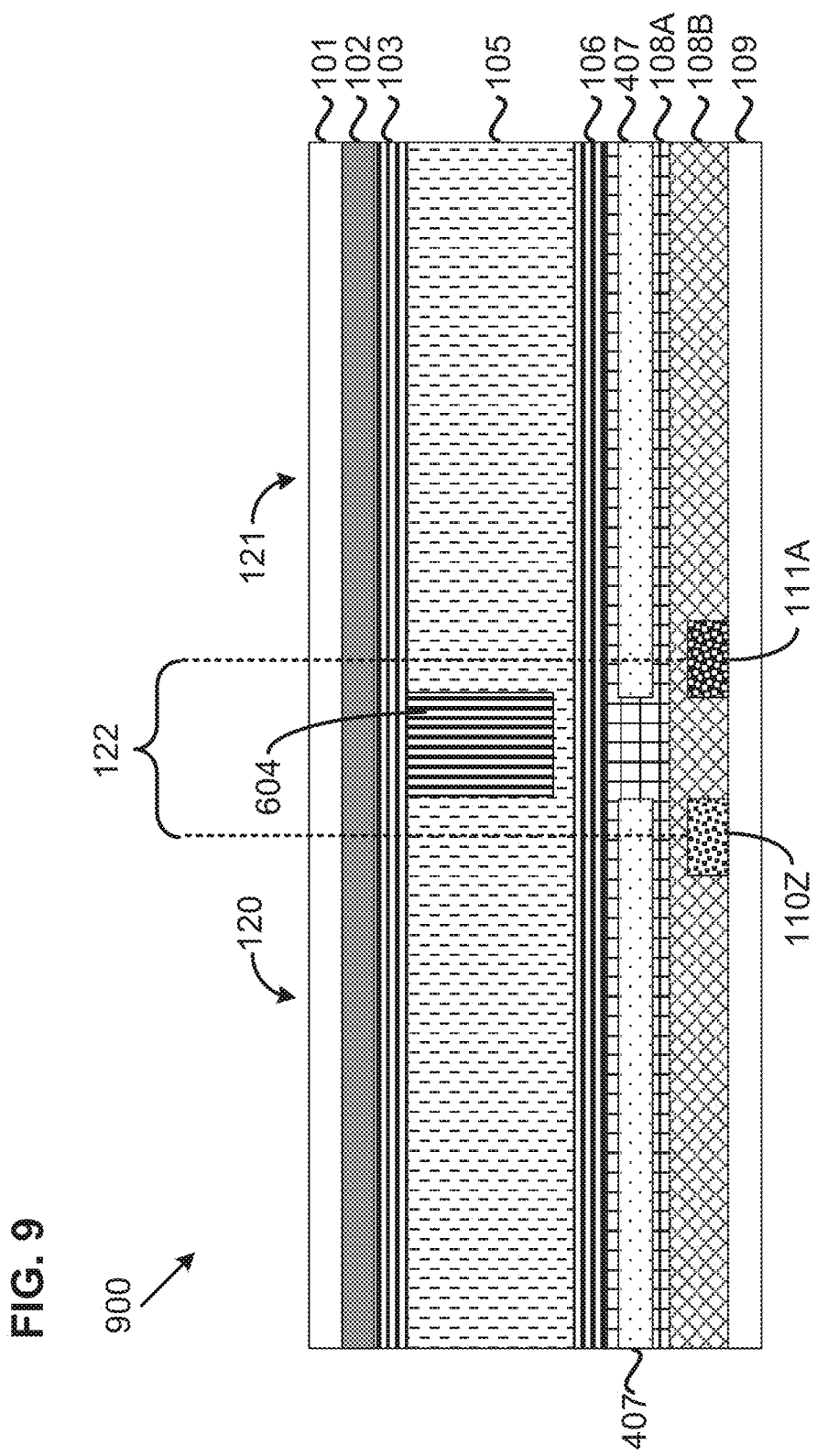
Figure 10:
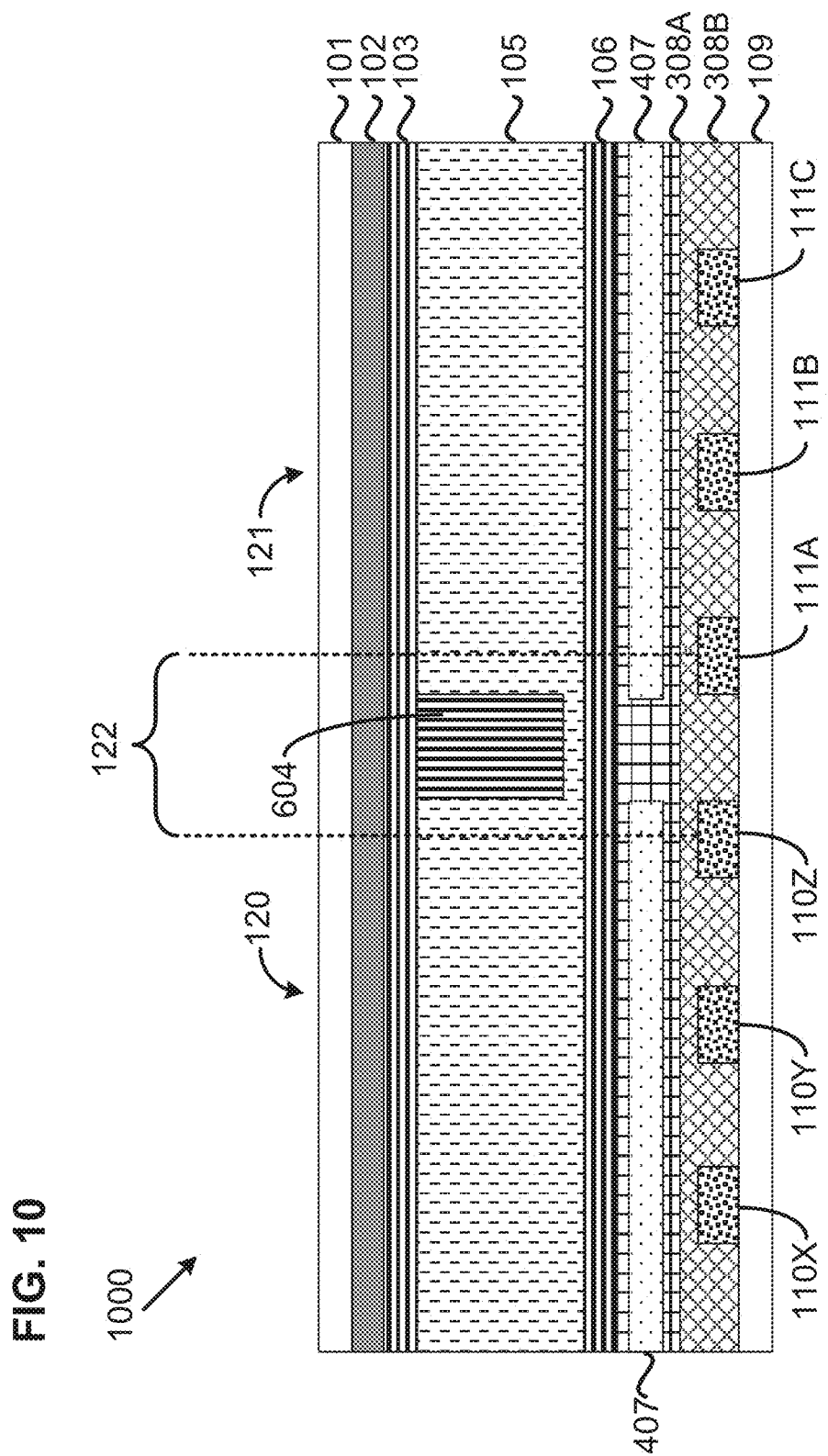
Figure 11:
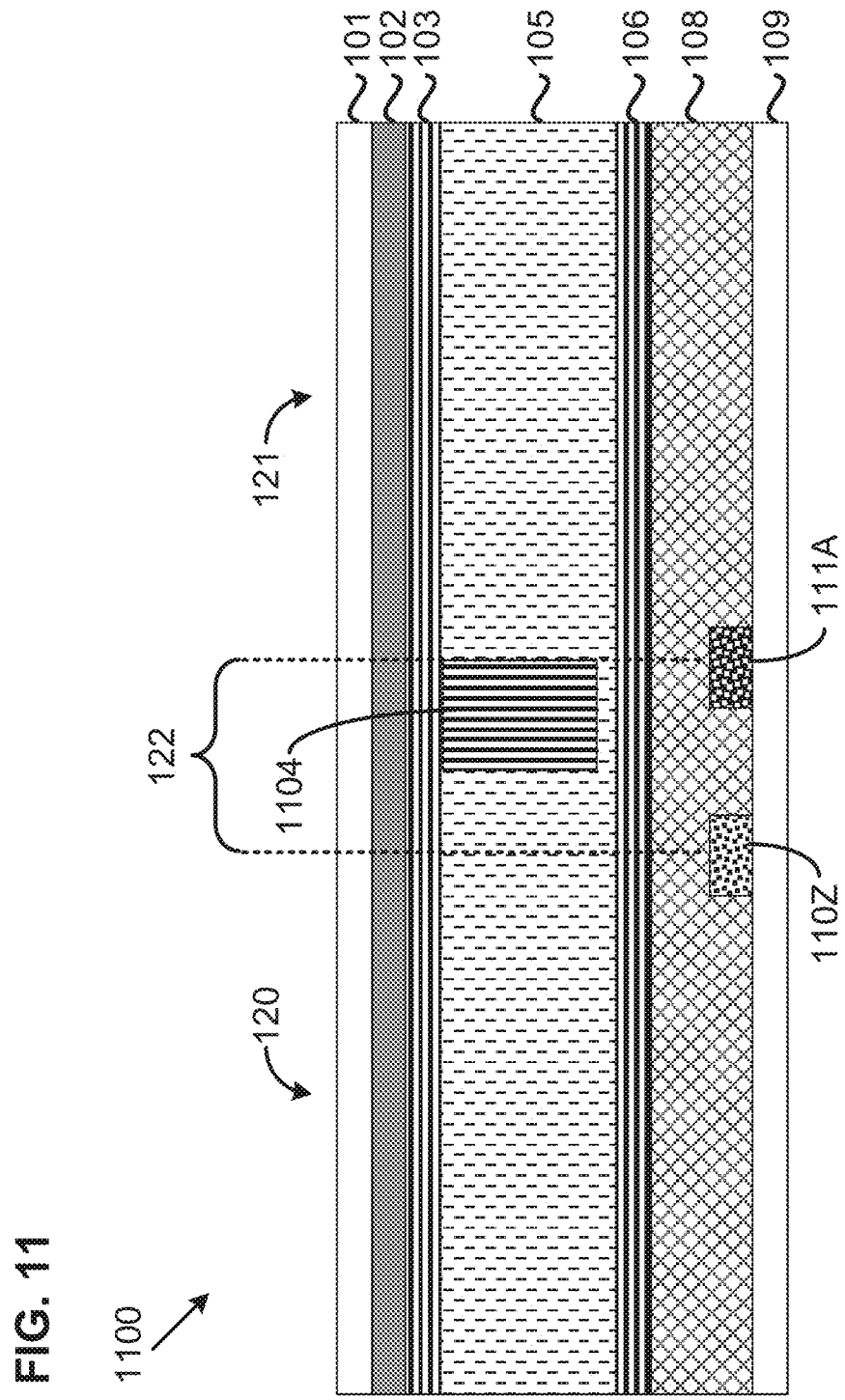
FIGS. 11-15 are cross-sectional views of portions of various LC GRIN lens structures employing a polymer wall positioned off-center in a transition region, in accordance with example implementations of the present disclosure.
Figure 12:
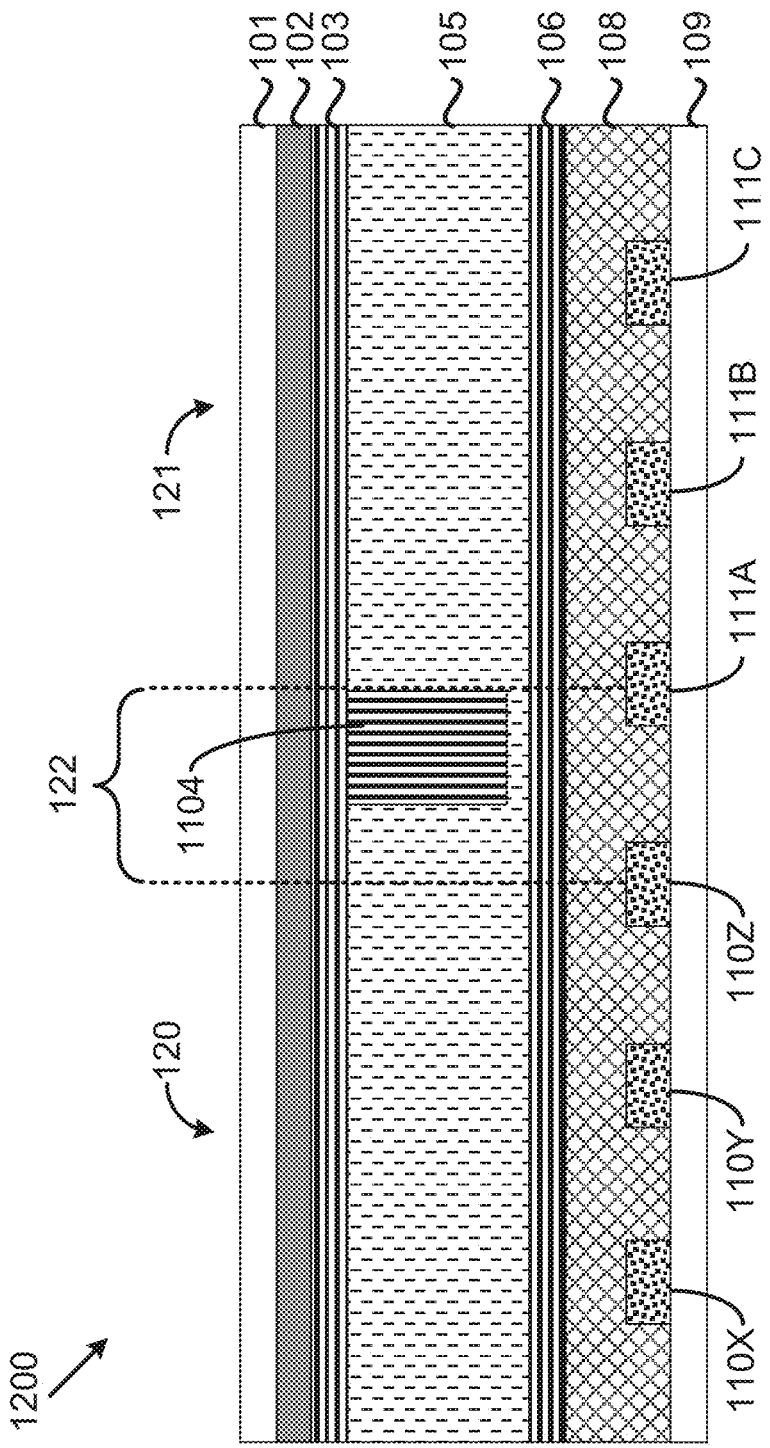
Figure 13:
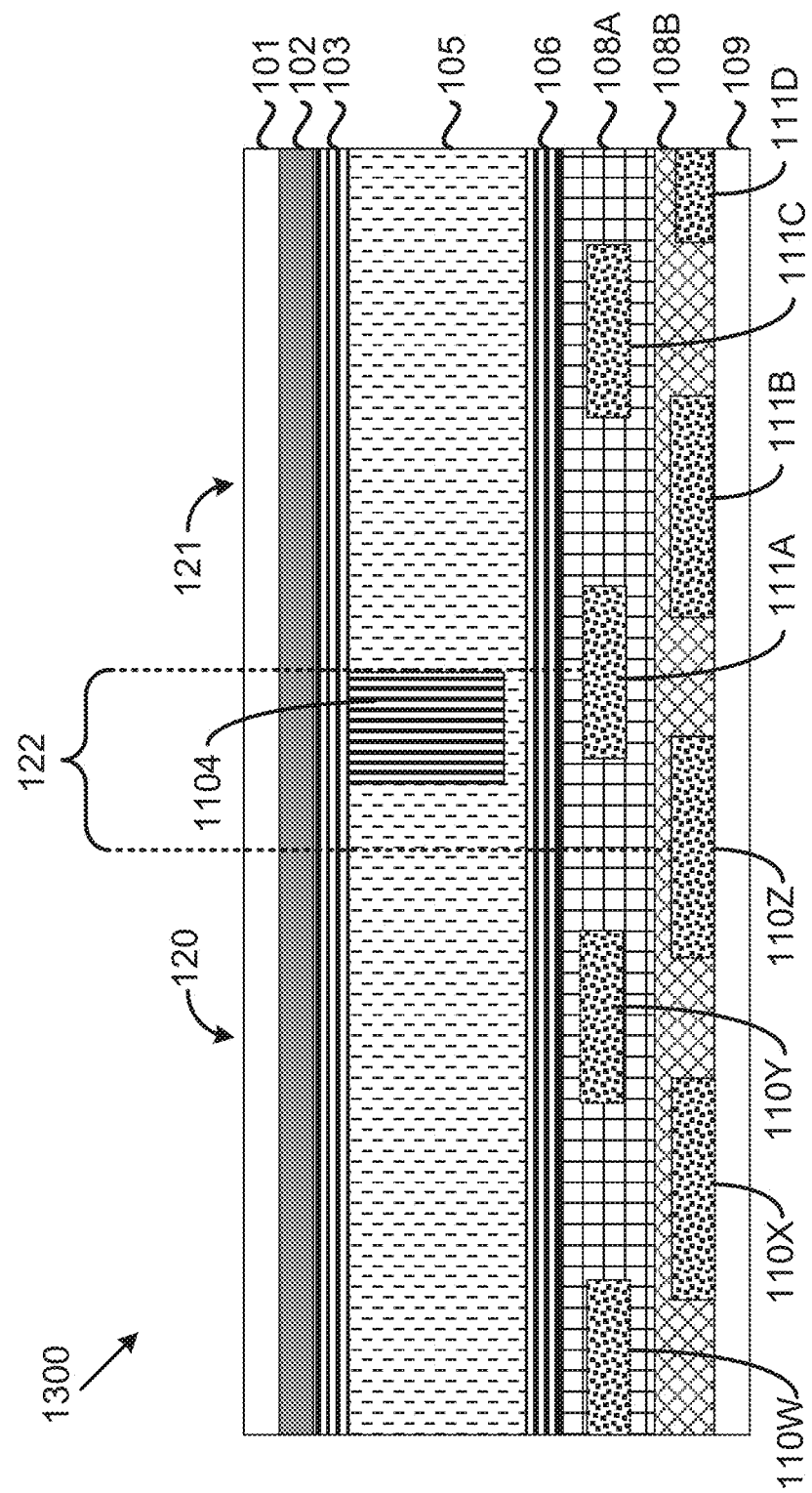
Figure 14:
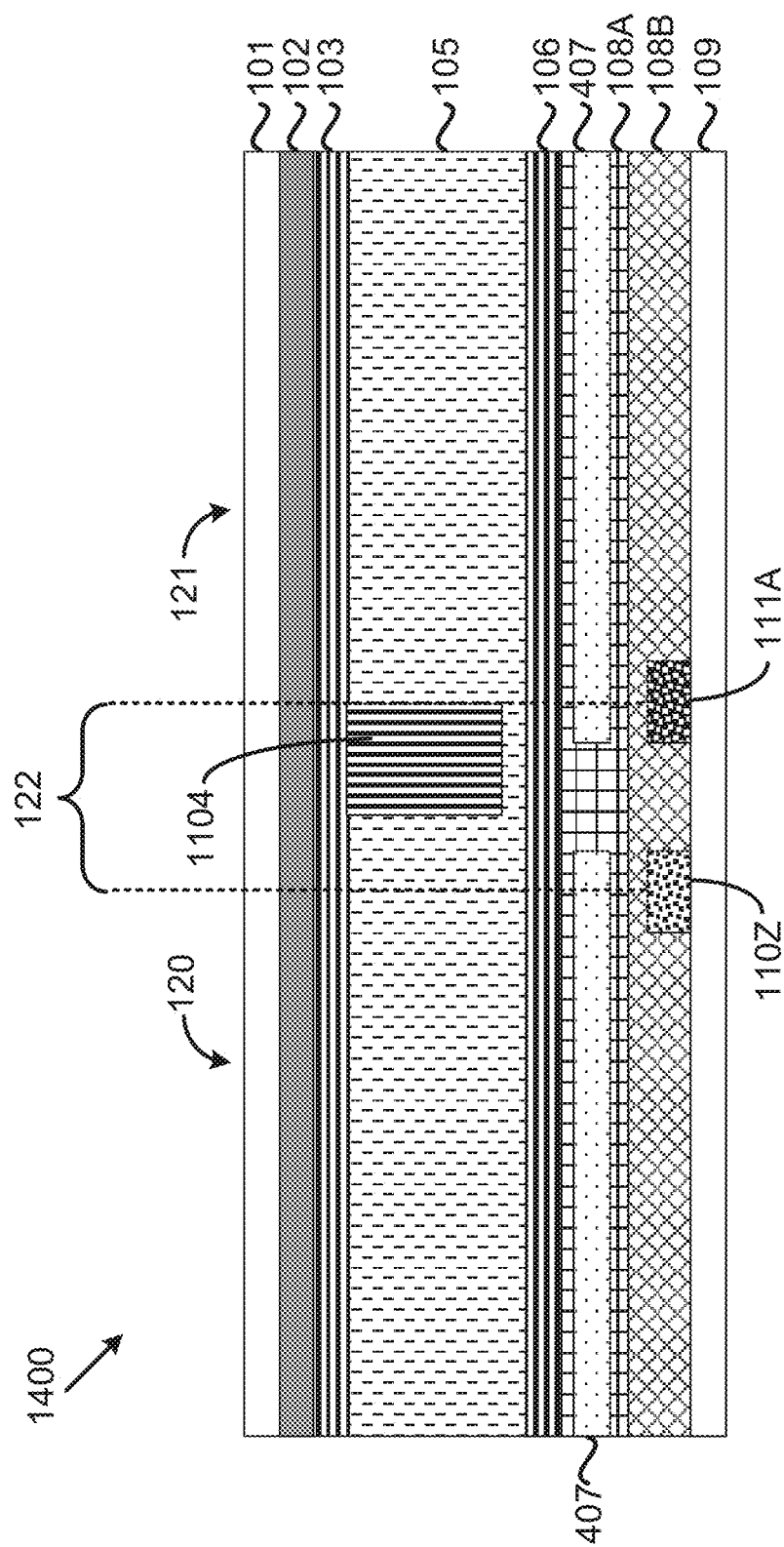
Figure 15:
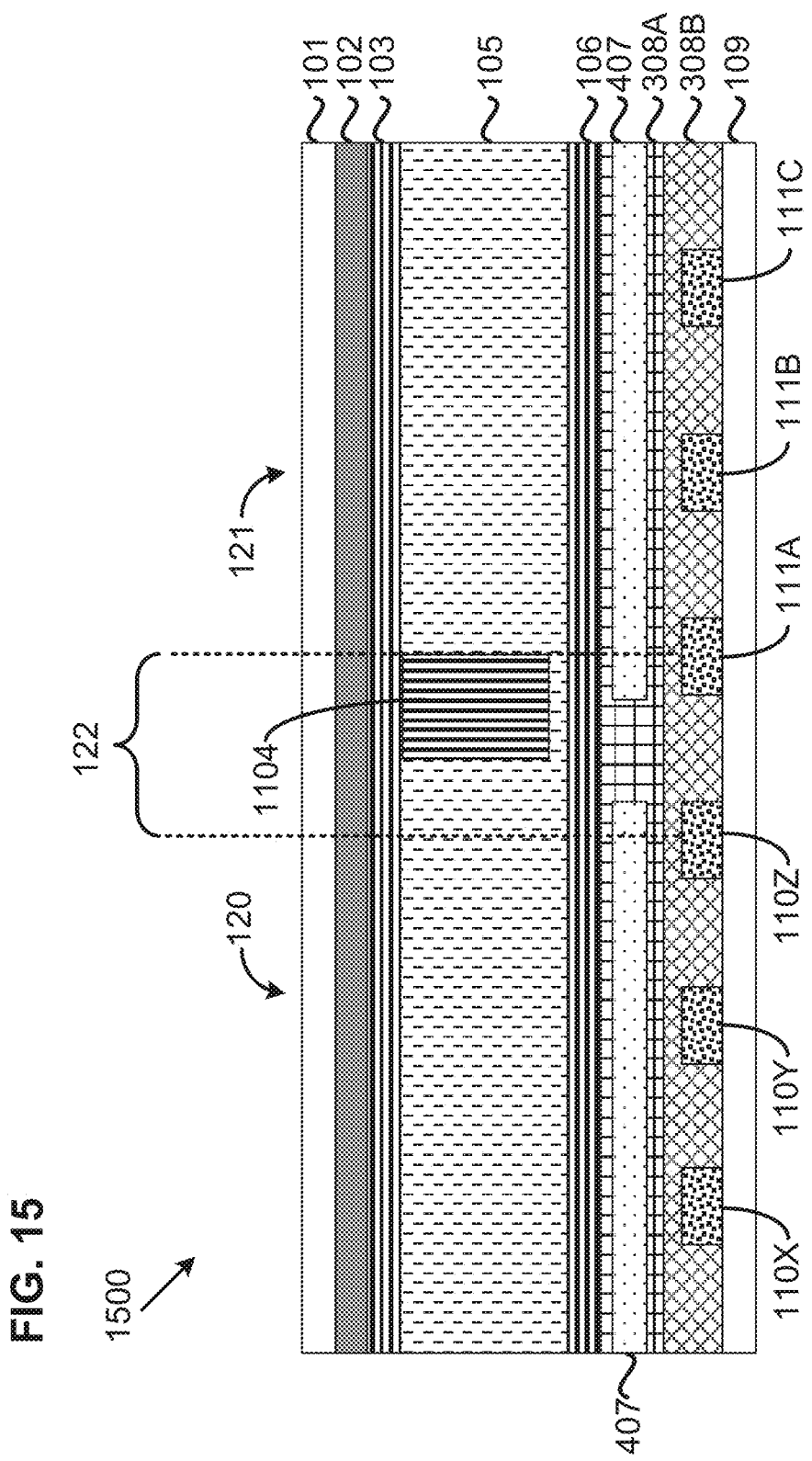
Figure 16:
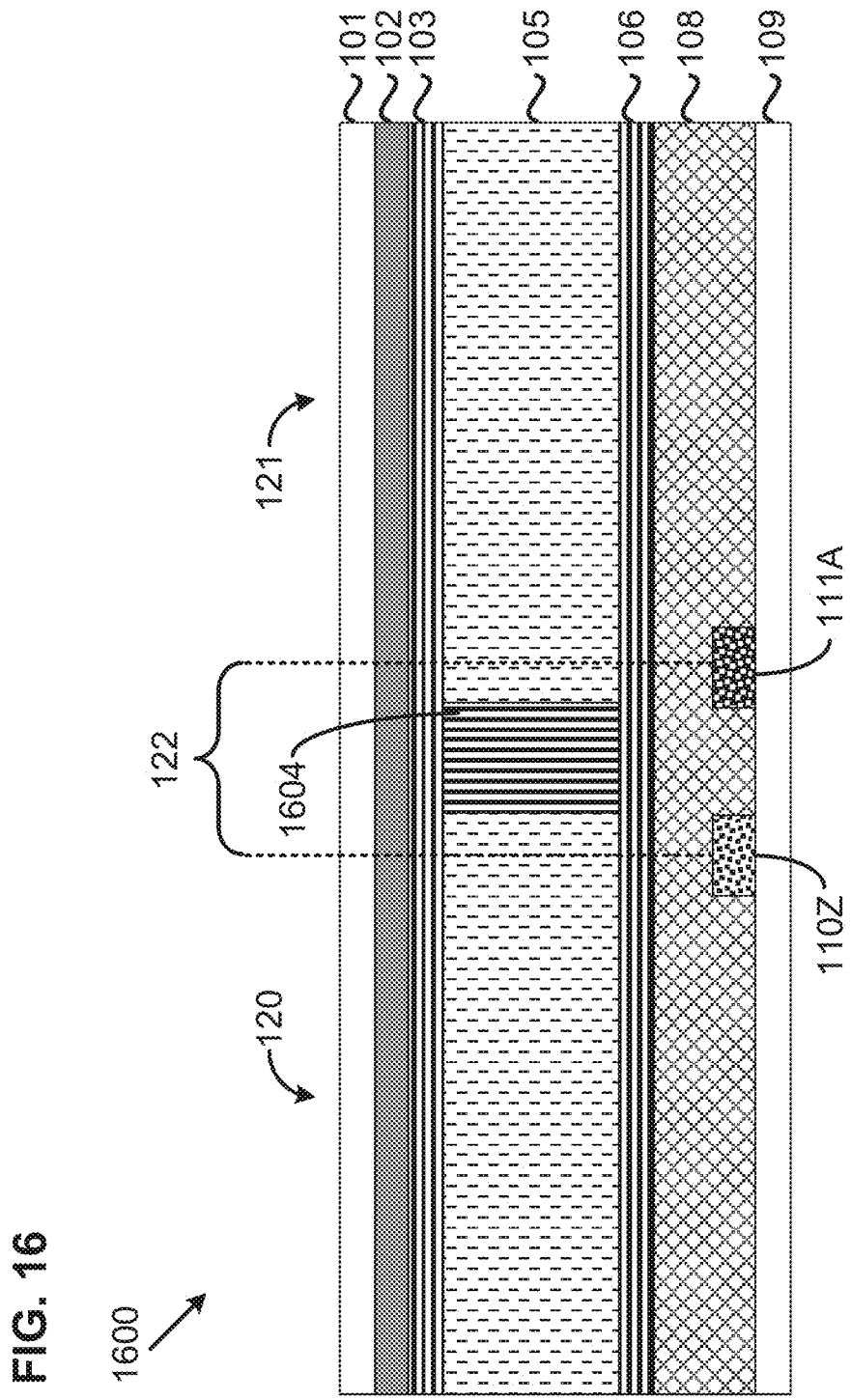
FIGS. 16-20 are cross-sectional views of portions of various LC GRIN lens structures employing a polymer wall extending across an entire depth of an LC layer, in accordance with example implementations of the present disclosure.
Figure 17:
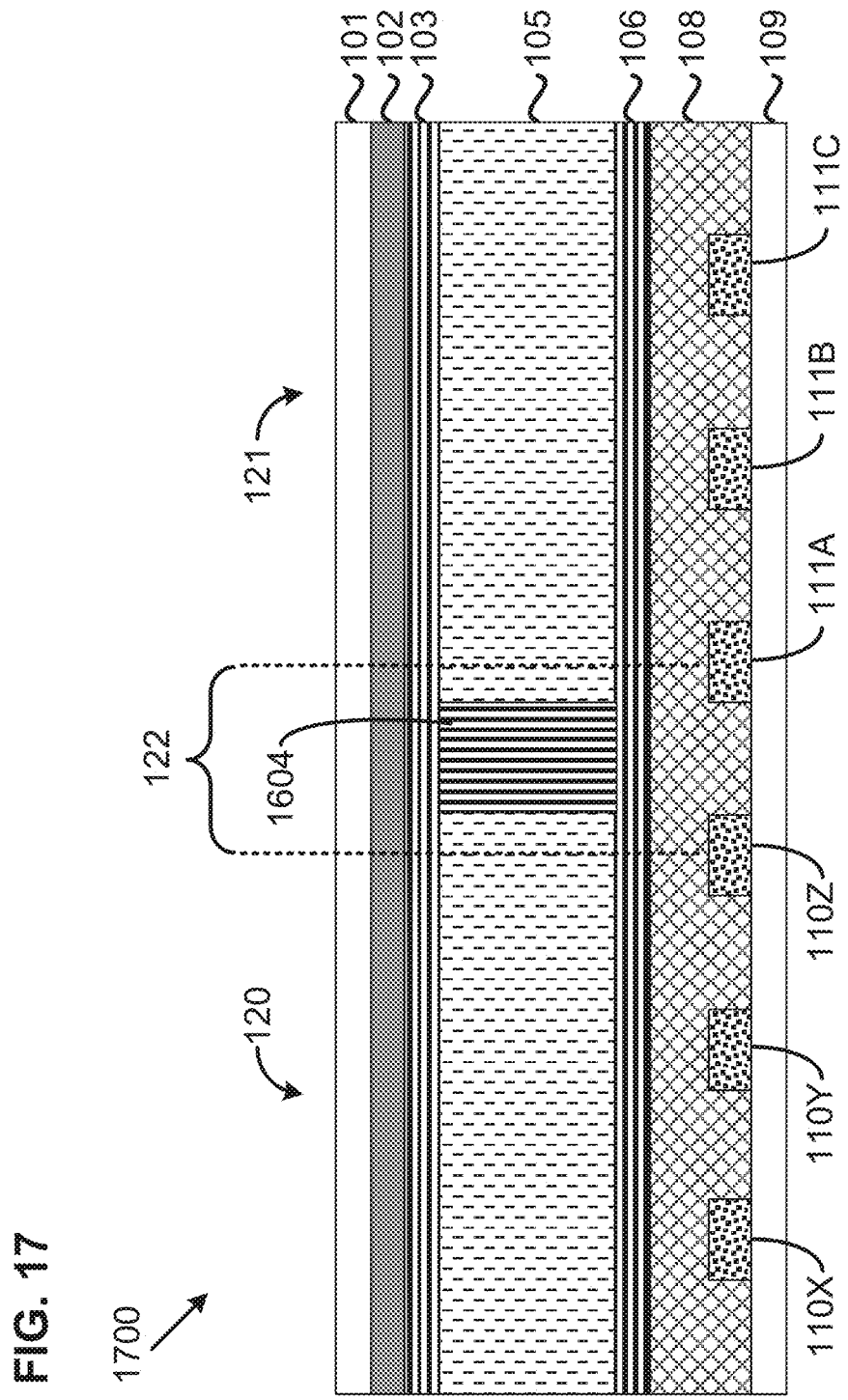
Figure 18:
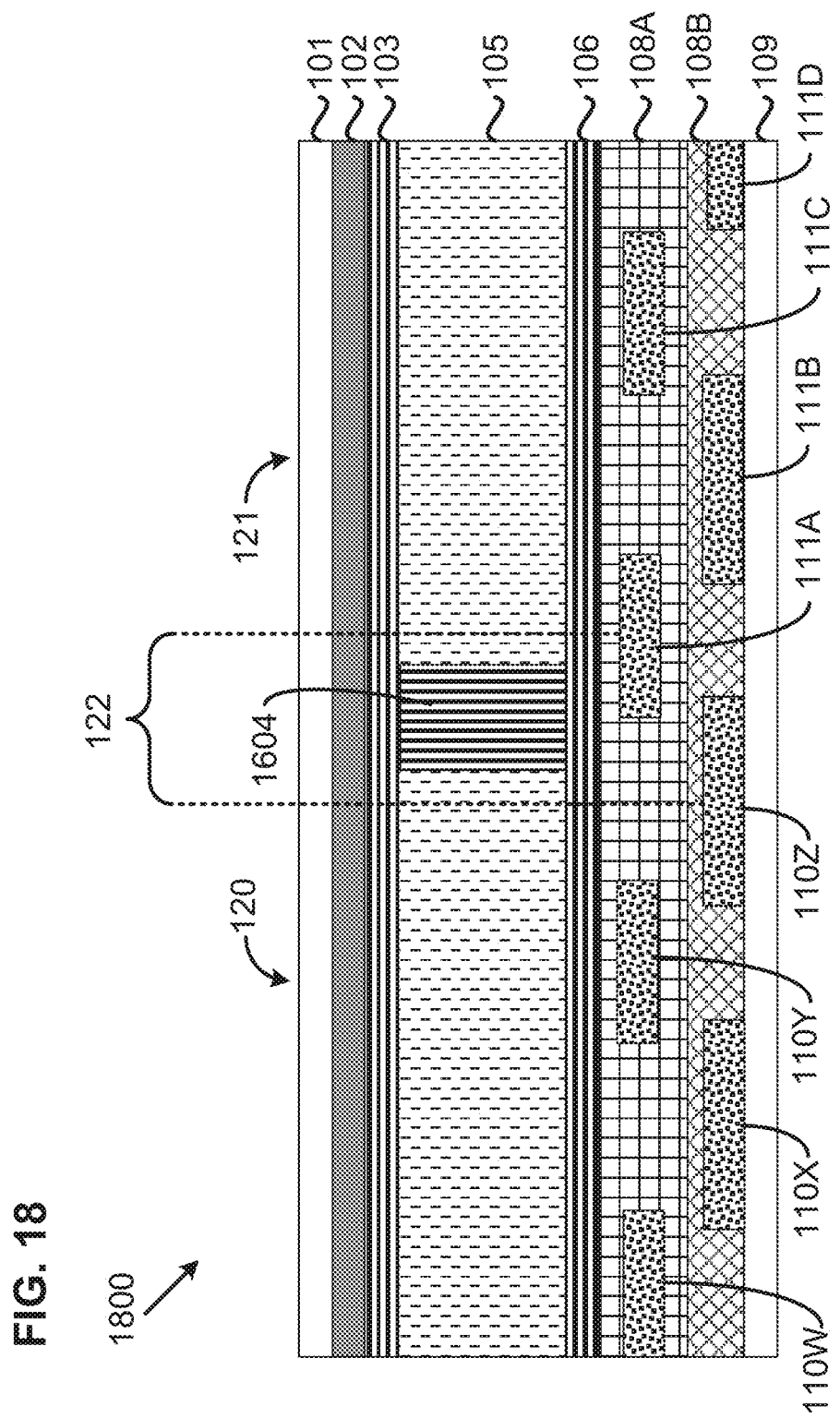
Figure 19:
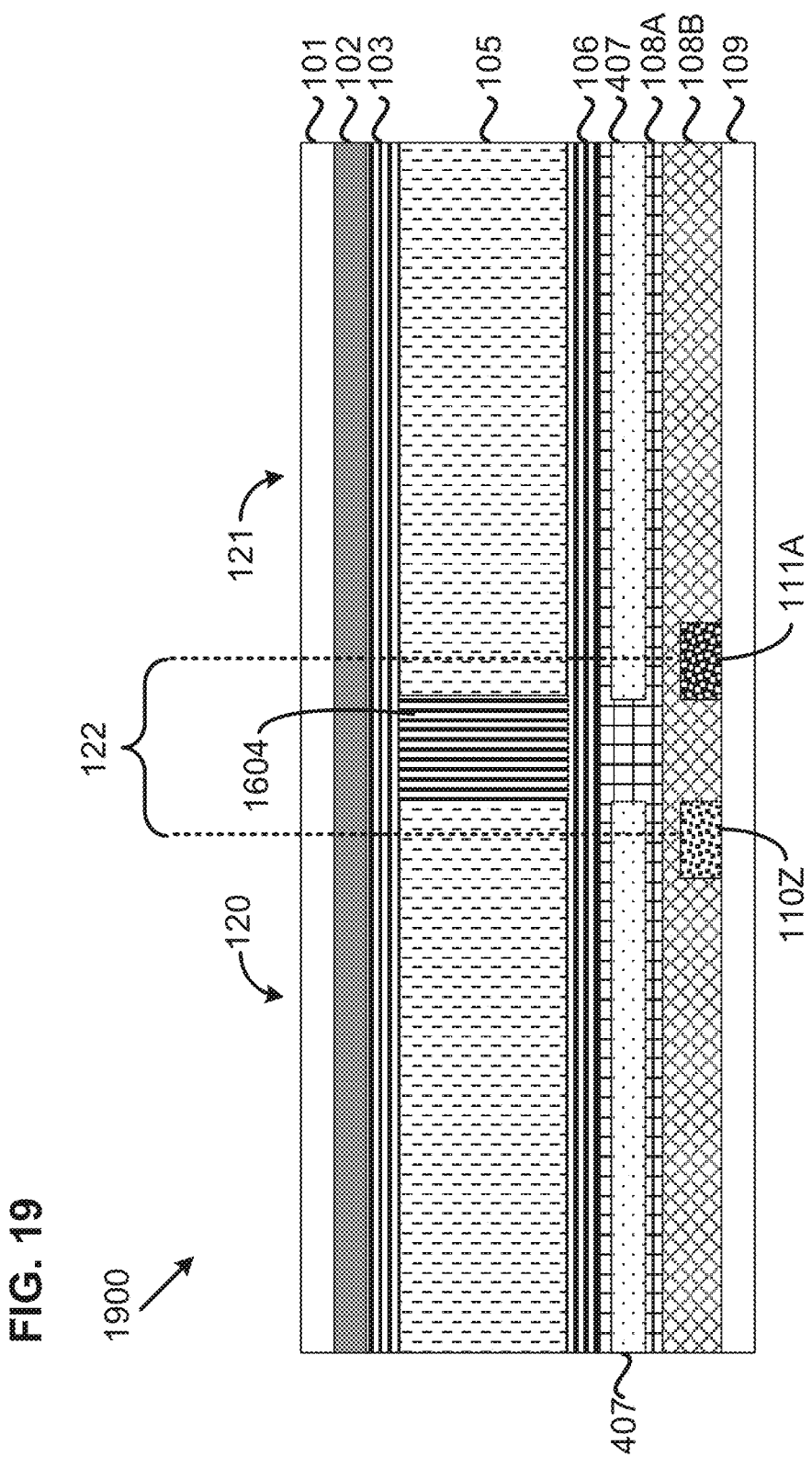
Figure 20:
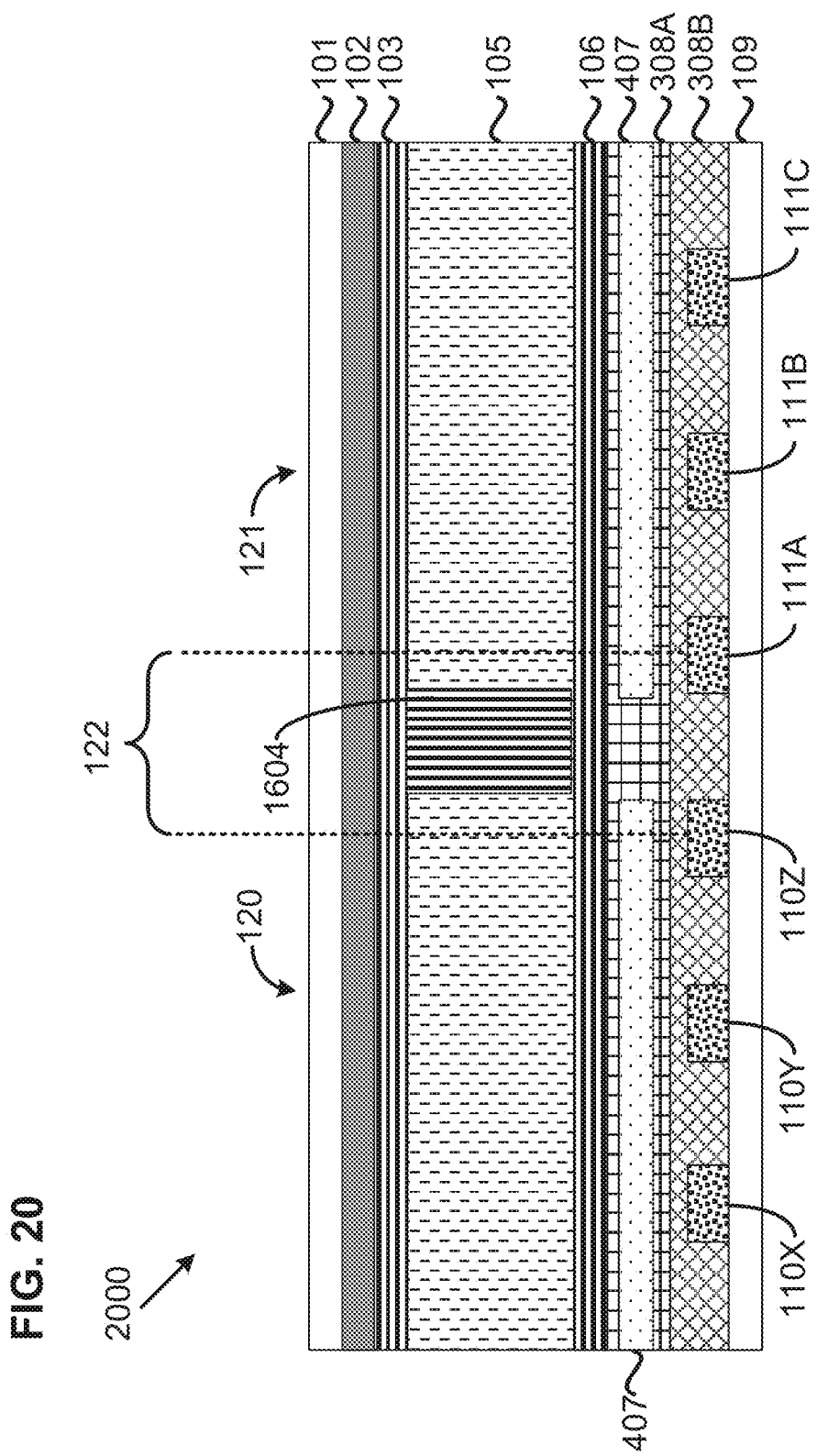
Figure 21:
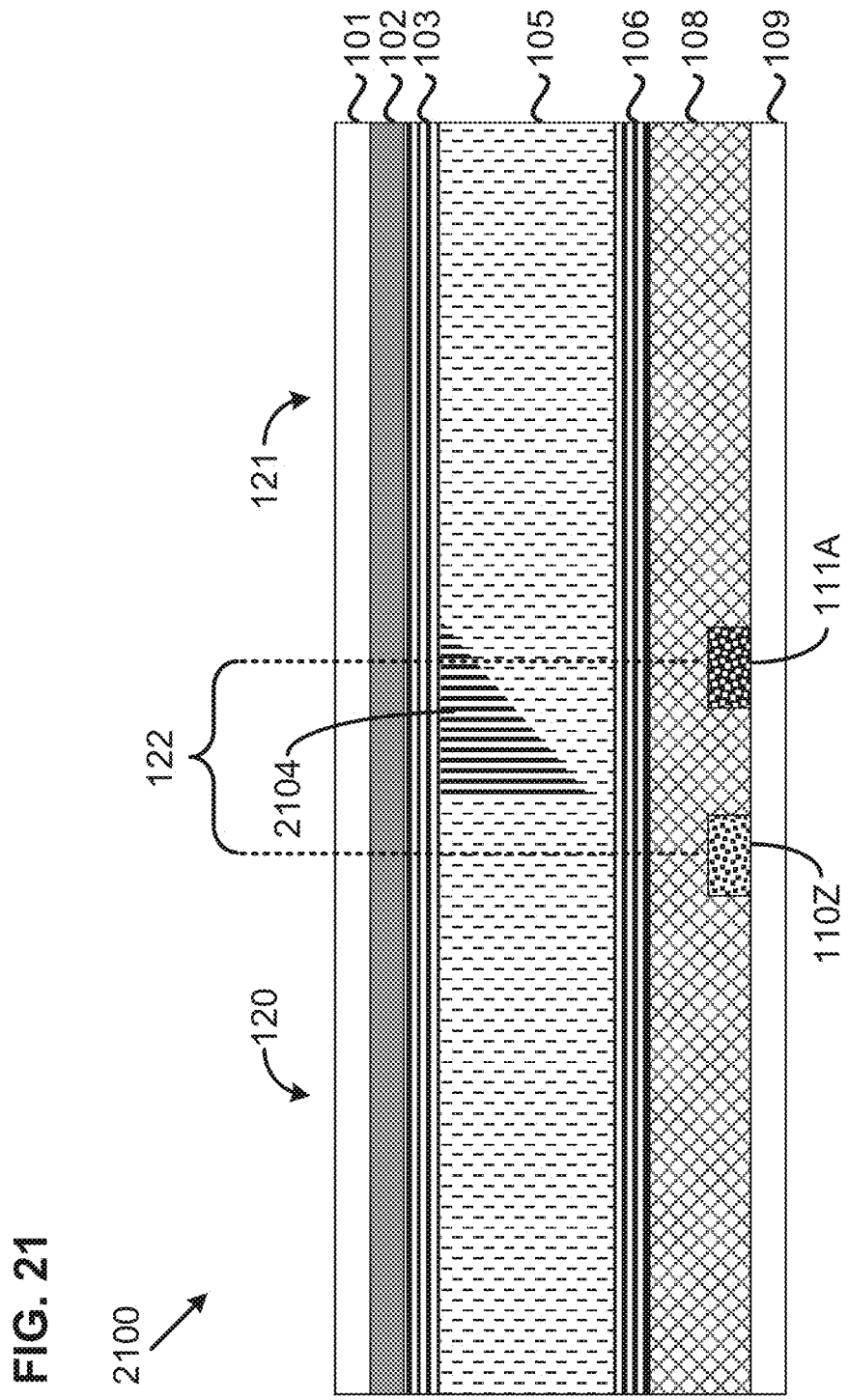
FIGS. 21-25 are cross-sectional views of portions of various LC GRIN lens structures employing an asymmetric polymer wall, in accordance with example implementations of the present disclosure.
Figure 22:
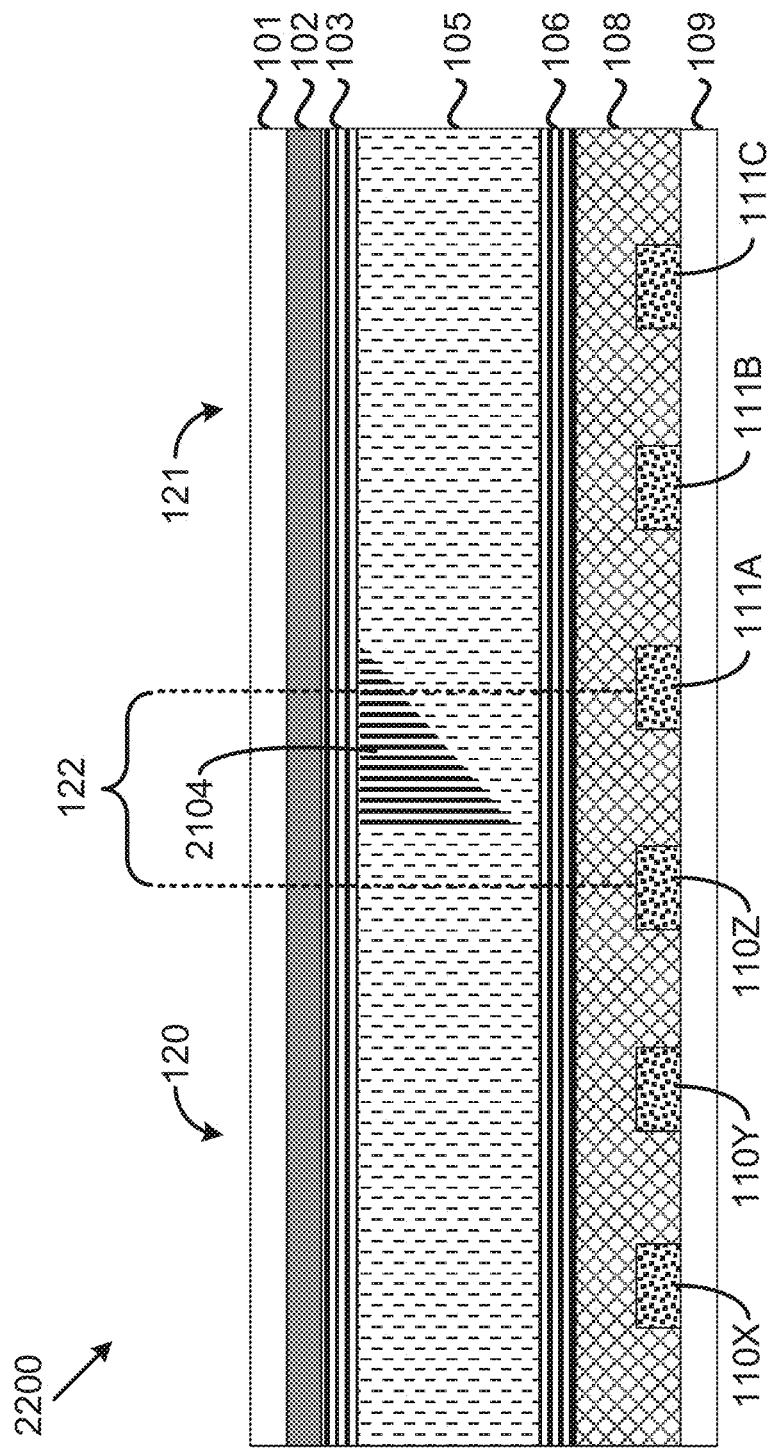
Figure 23:
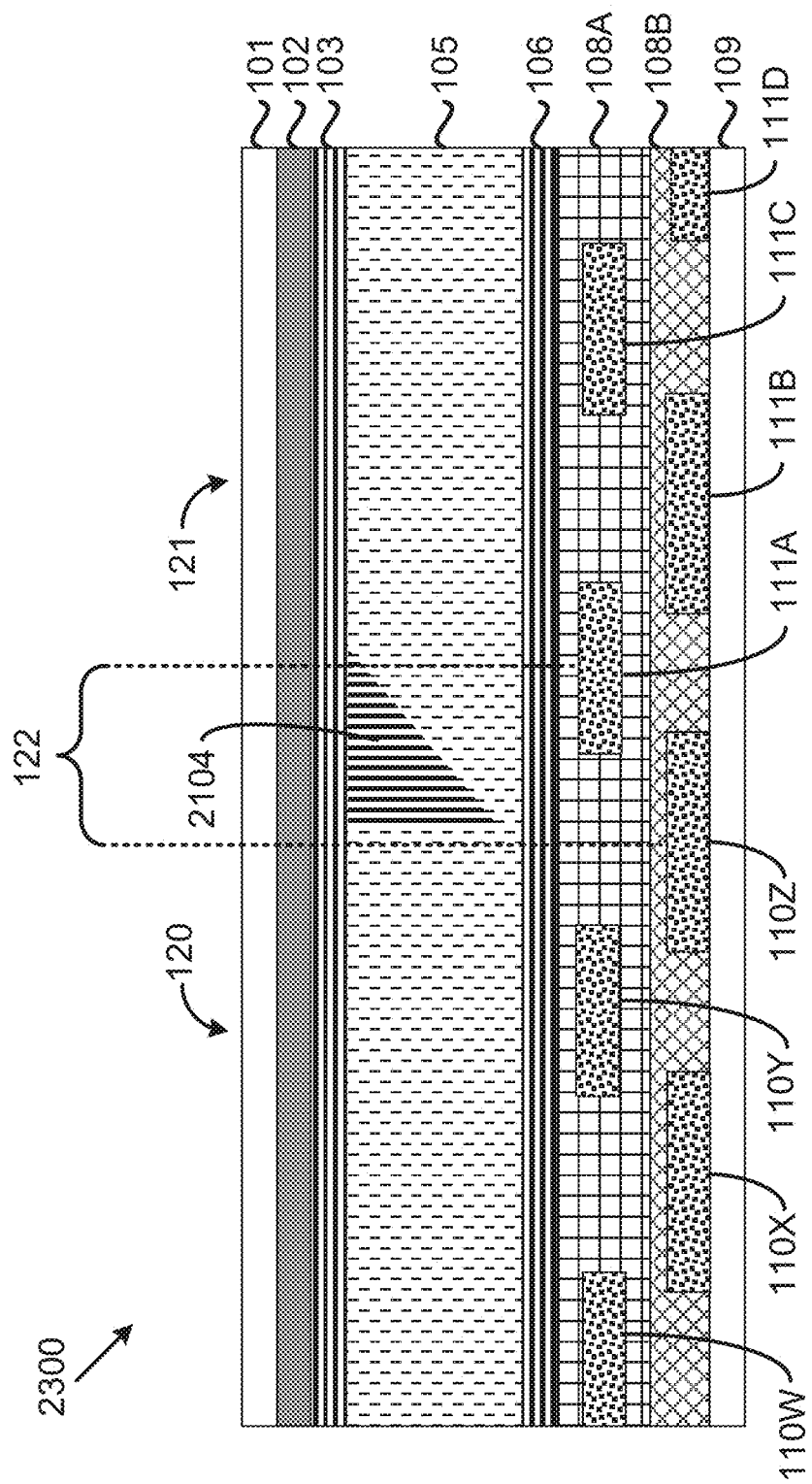
Figure 24:
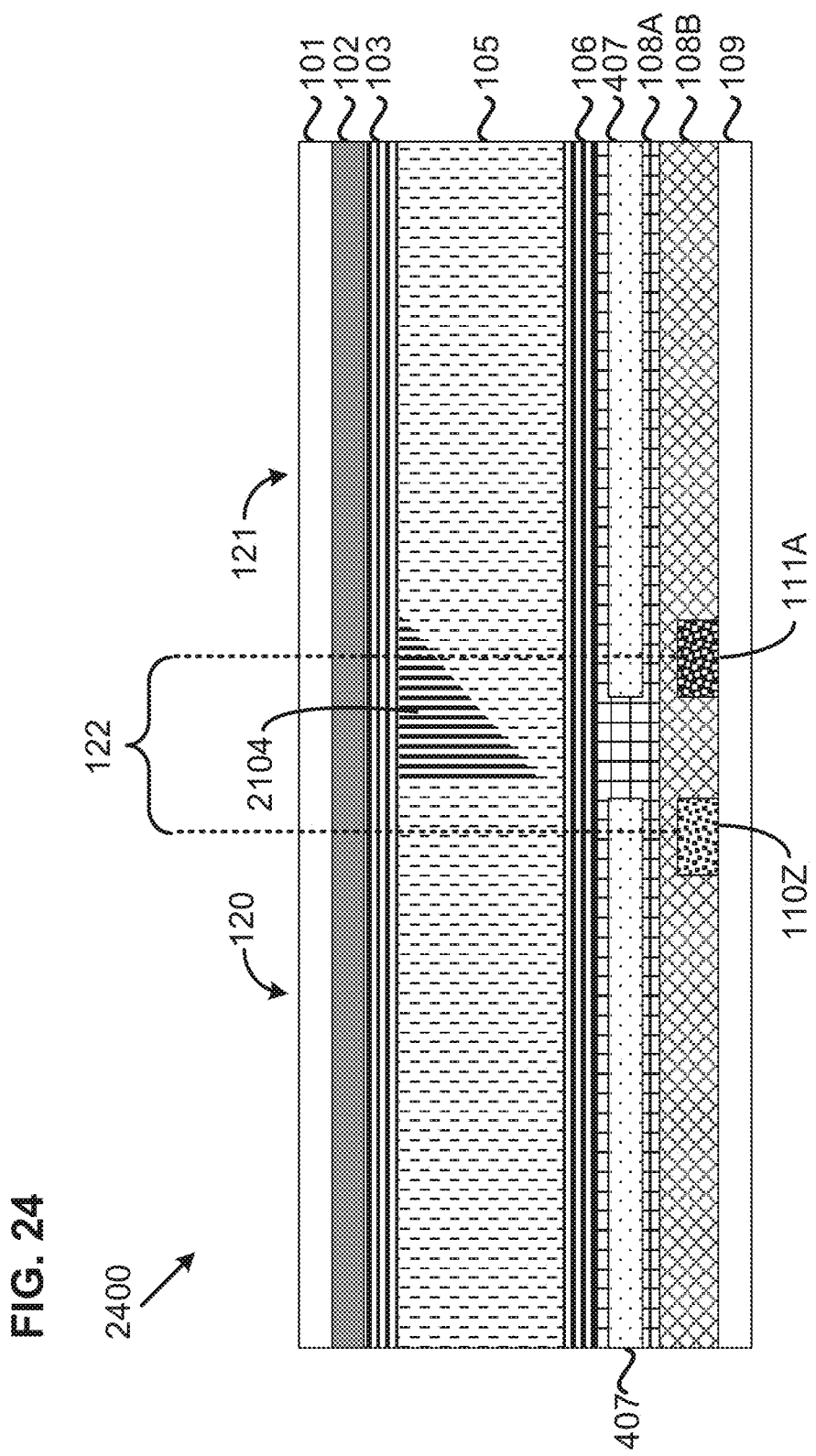
Figure 25:
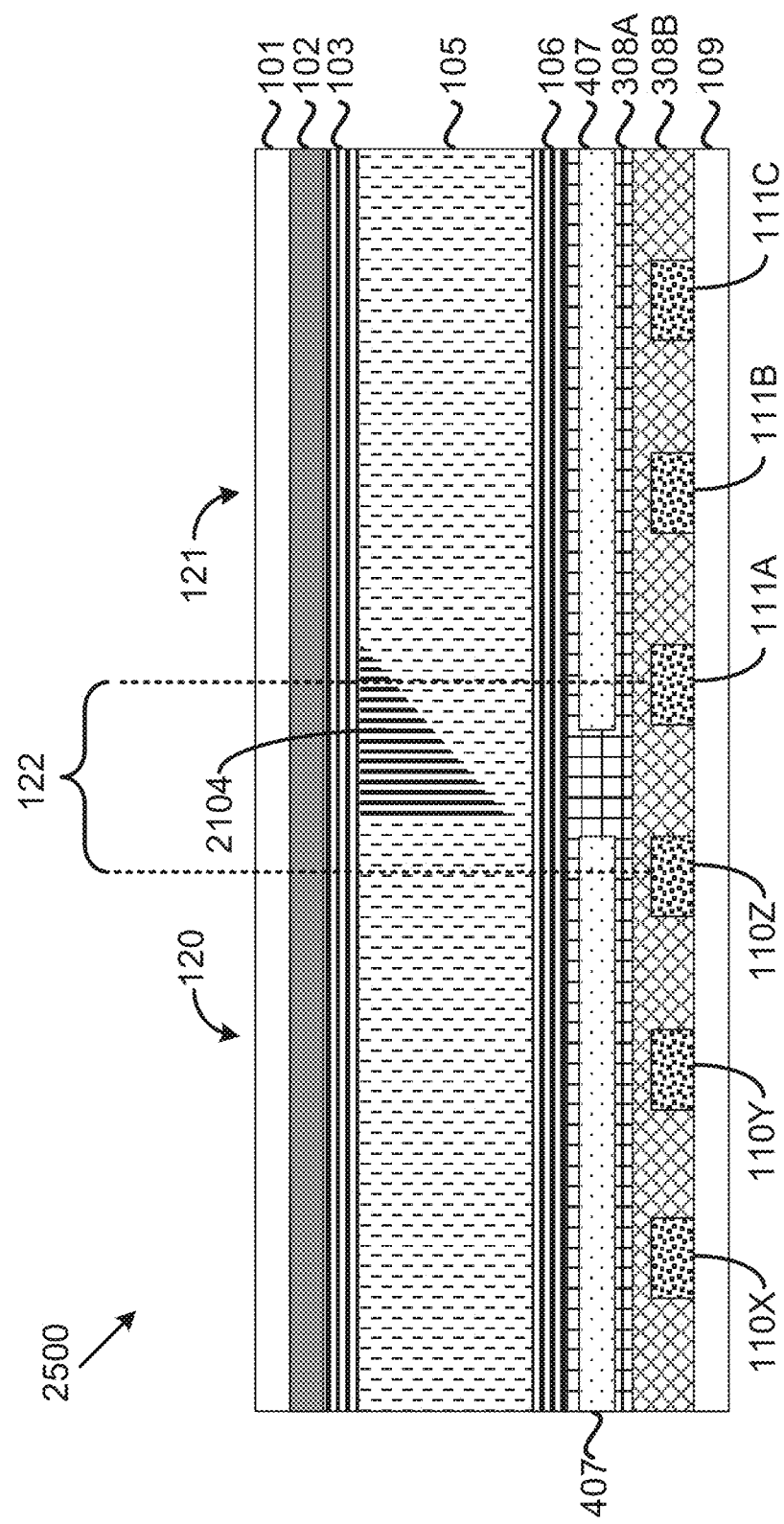

To facilitate a more immediate transition in optical phase in liquid crystals 115 (shown in FIG. 1) of LC layer 105, and thus enable a smaller transition region 122 to improve optical performance, some embodiments described below include a polymer wall that may provide a partial or complete physical barrier between liquid crystals 115 of first region 120 and liquid crystals 115 of second region 121. For example, FIG. 6 is a cross-sectional view of a portion of an LC GRIN lens structure 600 that includes the various elements discussed above in connection with LC GRIN lens structure 100 of FIG. 1, in addition to a polymer wall 604 residing in LC layer 105 within transition region 122. As shown, polymer wall 604 may extend downward from top LC alignment layer 103 and may not directly engage bottom LC alignment layer 106. In other examples, polymer wall 604 may instead extend upward from bottom LC alignment layer 106. Additionally, as shown in the specific example of FIG. 6, polymer wall 604 may be centered midway between last electrode 110Z and first electrode 111A. Further, while other polymer walls discussed herein extend downward from top LC alignment layer 103, as depicted in FIGS. 7-16, 21-25, and 31, these polymer walls may instead extend upward from bottom LC alignment layer 106 in other embodiments.

In at least some examples, a significant advantage of polymer wall 604 is that it replaces liquid crystals 115 in transition region 122, thus removing the ability of liquid crystals 115 to respond to the continuous electric field gradient and therefore producing an optical phase that may be substantively discontinuous, as is optically preferential. The refractive index of polymer wall 604 may be chosen to be substantively similar to the observed refractive index in the state where no voltage is applied to the electrodes so as to limit unwanted diffractive effects. Further, in some examples, an advantage of polymer wall 604 extending downward from top LC alignment layer 103 may be that the electric field gradient is greatest in an area above LC alignment layer 106. Consequently, the reorientation of liquid crystal 115 in this region also has the highest gradient, and thus provides the best optical performance. A potential advantage of polymer wall 604 extending upward from bottom LC alignment layer 106 may be a reduction in fabrication costs.

Dimensions of polymer wall 604 are indicated in FIG. 6, including a height 612 (e.g., relative to a height 618 of LC layer 105) and width 614 (e.g., relative to spacing 616 between last electrode 110Z of first region 120 and first electrode 111A of second region 121). In the particular example of FIG. 6, height 612 of polymer wall 604 may be slightly less than height 618 of LC layer 105, although other heights that significantly separate first region 120 from second region 121 may also be possible. Also, width 614 of polymer wall 604 is depicted in FIG. 6 as approximately matching spacing 616 between last electrode 110Z and first electrode 111A. However, in other examples, width 614 may be less than spacing 616 or greater than spacing 616 (e.g., up to a width of transition region 122). The specific width 614 of polymer wall 604 that supplies the optimum performance may depend on the specific material properties of liquid crystals 115 used in LC layer 105. In some cases, setting height 612 of polymer wall 604 to be the same as height 618 of LC layer 105 may serve to completely remove liquid crystals 115 from that area, and therefore eliminate the need for liquid crystals 115 to reorient within transition region 122. In some embodiments, setting height 612 of polymer wall 604 to be less than height 618 of the LC layer 105 may be desirable to allow a small area of liquid crystals 115 to be present in transition region 122 so that a small optical phase gradient is present within this area.

Further, polymer wall 604 may extend through most or all of an entire third dimension (e.g., orthogonal to the height and width of polymer wall 604 discussed above) through transition region 122. For example, for a ring-shaped transition region 122, polymer wall 604 may extend circumferentially along most or all of transition region 122.

Polymer wall 604 may be an optically isotropic polymer in some examples and may be an optically birefringent polymer in others. In some cases, a birefringent polymer may be employed to match the refractive index in both directions in parallel within LC layer 105 in at least one of first region 120 or second region 121, thus possibly improving optical performance over that associated with an isotropic polymer wall 604 that may match a refractive index for only one light polarization. This matching of the refractive index by polymer wall 604 may provide the desired optical phase in the portion of LC GRIN lens structure 600 in which polymer wall 604 is located. Further, a birefringent polymer wall 604 may induce preferable alignment of liquid crystals 115 at the edges of polymer wall 604. In other examples, an optically isotropic polymer may instead be desirable. These various materials may also be used for other polymer wall examples discussed below in conjunction with FIGS. 7-25 and 31. Further, in the case of a TN-type LC GRIN lens structure, an optically isotropic polymer for polymer wall 604 will not produce a rotation of the polarization of light within transition region 122, in contrast to the rotation of the polarization of light that occurs within the rest of the LC GRIN lens structure, which may be desirable for the optical performance of LC GRIN lens structures described herein. In contrast, if an optically birefringent polymer is used, polymer wall 604 could be manufactured in such a manner as to produce a sufficiently similar rotation of the polarization of light as occurs within the remainder of the LC GRIN lens structure, which may be desirable to the optical performance of the LC GRIN lens structures discussed herein in some examples.

In some embodiments, polymer wall 604 may be formed by way of an embossing or etching process onto top LC alignment layer 103 or bottom LC alignment layer 106 prior to combining the top and bottom portions of LC GRIN lens structure 600 associated with top substrate 101 and bottom substrate 109, and filling LC layer 105 with liquid crystal material. In other examples, polymer wall 604 may be manufactured after substrates 101 and 109 and associated layers are combined, such as by mixing a monomer with the liquid crystal material prior to filling LC layer 105 therewith, and then exposing LC GRIN lens structure 600 after filling LC layer 105 to light that polymerizes the monomer. In such examples, the light may be spatially modulated by a mask that may allow light to reach only those areas where polymer wall 604 will reside. This "in-situ" manufacturing process may be especially suited for creating a birefringent polymer wall 604 in some examples. Other methods of manufacture for polymer wall 604 are also possible. Each of these manufacturing methods also may be applied to other polymer wall embodiments described below in association with FIGS. 7-25 and 31.

In operation, polymer wall 604 may substantially separate liquid crystals 115 of first region 120 and second region 121 while still allowing some liquid crystal material therebetween. By providing such isolation, the orientation of liquid crystals 115 on a side of polymer wall 604 nearest first region 120 and on the opposing side nearest second region 121 may not physically affect or influence each other, thus possibly facilitating a stronger influence on liquid crystals 115 in first region 120 by last electrode 110Z and on liquid crystals 115 in second region 121 by first electrode 111A. Consequently, use of polymer wall 604 may allow a smaller spacing 616 between last electrode 110Z and first electrode 111A, and thus a narrower transition region 122 than typically implemented.

Each of FIGS. 7, 8, 9, and 10 is a cross-sectional view of a portion of an LC GRIN lens structure 700, 800, 900, and 1000, respectively. Each LC GRIN lens structure 700, 800, 900, and 1000 employs the structure of corresponding LC GRIN lens structure 200, 300, 400, and 500, respectively, with the addition of polymer wall 604. In each example, polymer wall 604 may be as described above in connection with FIG. 6, including all variants thereof, and provide at least similar functionality as discussed above.

Each of FIGS. 11, 12, 13, 14, and 15 is a cross-sectional view of a portion of an LC GRIN lens structure 1100, 1200, 1300, 1400, and 1500, respectively. Further, each LC GRIN lens structure 1100, 1200, 1300, 1400, and 1500 employs the structure of corresponding LC GRIN lens structure 600, 700, 800, 900, and 1000, respectively, but with a polymer wall 1104 offset from being centered between last electrode 110Z of first region 120 and first electrode 111A of second region 121. Use of an offset polymer wall 1104 may alter the reorientation behavior of liquid crystals 115 in a preferable way. While each embodiment of FIGS. 11-15 depicts polymer wall 1104 being offset toward second region 121, polymer wall 1104 may be offset toward first region 120 in other examples. Also, while polymer wall 1104 is shown extending downward from top LC alignment layer 103, in other embodiments, polymer wall 1104 may extend upward from bottom LC alignment layer 106. In some examples, offset polymer wall 1104 may allow the corresponding LC GRIN lens structure to be further optimized in the case where the variable focal power of the lens structure is limited to either positive values or negative values (i.e a solely divergent lens or a soley convergant lens). In contrast, in the case where the variable focal power of the lens structure may be changed between positive values and negative values, positioning of polymer wall 604 in the center of transition region 122 may be desired.

In each LC GRIN lens structure 1100, 1200, 1300, 1400, and 1500, a first side of polymer wall 1104 is substantially aligned with a boundary between second region 121 and transition region 122, which may help induce a desired orientation of liquid crystals 115 of LC layer 105 under the influence of first electrode 111A at an edge of second region 121. In other embodiments, additionally or alternatively, a second side of polymer wall 1104 may be substantially aligned with a boundary between first region 120 and transition region 122, such as to induce a desired orientation of liquid crystals 115 of LC layer 105 by the electric field provided by last electrode 110Z at an edge of first region 120.

Each of FIGS. 16, 17, 18, 19, and 20 is a cross-sectional view of a portion of an LC GRIN lens structure 1600, 1700, 1800, 1900, and 2000, respectively. Further, each LC GRIN lens structure 1600, 1700, 1800, 1900, and 2000 employs the structure of corresponding LC GRIN lens structure 600, 700, 800, 900, and 1000, respectively, but with a polymer wall 1604 that bridges completely across LC layer 150 between top LC alignment layer 103 and bottom LC alignment layer 106. In some embodiments, use of polymer wall 1604 may reduce cost by eliminating the use of non-optical spacer elements within LC layer 105 that may otherwise be employed to stabilize the distance between top LC alignment layer 103 and bottom LC alignment layer 106. In some embodiments, polymer wall 1604 may be a desirable structure for the in-situ manufacturing process described above, as producing a polymer wall 604 that does not completely bridge LC layer 150 may be technically challenging for such a process.

While polymer wall 1604 is shown in LC GRIN lens structures 1600, 1700, 1800, 1900, and 2000 as being centered between last electrode 110Z and first electrode 111A, polymer wall 1604 may be located off-center within transition region 122, as discussed above in conjunction with LC GRIN lens structures 1100, 1200, 1300, 1400, and 1500.

Each of FIGS. 21, 22, 23, 24, and 25 is a cross-sectional view of a portion of an LC GRIN lens structure 2100, 2200, 2300, 2400, and 2500, respectively. Further, each LC GRIN lens structure 2100, 2200, 2300, 2400, and 2500 employs the structure of corresponding LC GRIN lens structure 600, 700, 800, 900, and 1000, respectively, but with a polymer wall 2104 that is asymmetric in shape. In these particular embodiments, polymer wall 2104 may possess the shape of a right triangle. However, other asymmetric shapes, such as a triangular shape without a right angle, a trapezoidal shape, a shape with one or more curved surfaces, and so on, may be used for polymer wall 2104 in other examples. Such shapes for polymer wall 2104 may induce a favorable orientation of liquid crystals 115 of LC layer 105 in either or both of first region 120 and second region 121 at or near transition region 122. In some examples, asymmetric polymer wall 2104 may allow the corresponding LC GRIN lens structure to be further optimized in the case where the variable focal power of the lens structure is limited to either positive values or negative values. In contrast, in the case where the variable focal power of the lens may be changed between positive values and negative values, a symmetric polymer wall 604 may be desired.

While polymer wall 2104 is shown in LC GRIN lens structures 2100, 2200, 2300, 2400, and 2500 as being off-center at particular locations between last electrode 110Z and first electrode 111A, polymer wall 2104 may be located off-center within transition region 122 in other ways, as discussed above in connection with FIGS. 11-15. In yet other examples, polymer wall 2104 may be centered within transition region 122, as polymer wall 604 depicted in FIGS. 6-10. Additionally, or alternatively, while polymer wall 2104 is shown as extending from one LC alignment layer (e.g., in this case, top LC alignment layer 103), polymer wall 2104 may also bridge completely across LC layer 105 between top LC alignment layer 103 and bottom LC alignment layer 106.

While FIGS. 6-25 illustrate embodiments in which a polymer wall (e.g., polymer walls 604, 1104, 1604, 2104, and 2604) is employed to more efficiently orient liquid crystals 115 within transition region 122 from a spatial perspective, FIGS. 26-30 depict other embodiments in which a supplemental or transition electrode (e.g., electrode 2614) positioned external to LC layer 105 may affect the electric field applied within transition region 122 to provide a similarly efficient reorientation.

Figure 26:
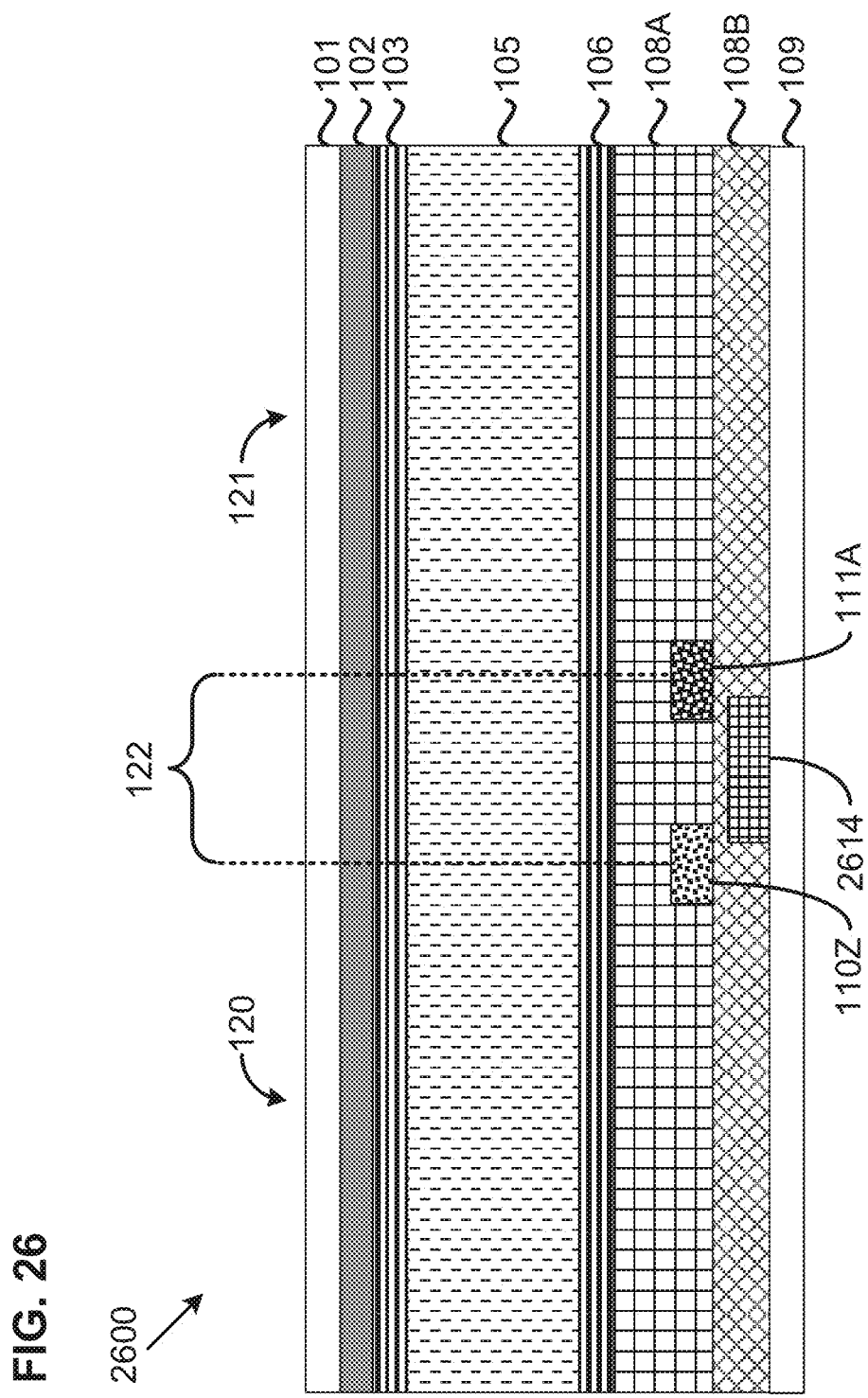

For example, FIG. 26 is a cross-sectional view of an LC GRIN lens structure 2600 that includes various components shown in FIGS. 1 and 2, including top substrate 101, common electrode 102, top LC alignment layer 103, LC layer 105 (including liquid crystals 115 within LC layer, not illustrated in FIG. 26), bottom LC alignment layer 106, bottom substrate 109, last electrode 110Z of first region 120, first electrode 111A of second region 121, and transition region 122. In addition, LC GRIN lens structure 2600 includes a "supplemental" electrode, or a transition electrode 2614, located atop bottom substrate 109 between last electrode 110Z (of a first region) and first electrode 111A (of a second region), in a row separate from and below those electrodes.

In some embodiments, transition electrode 2614 may be deposited on bottom substrate 109 and encased with intermediate insulator layer 108B. Last electrode 110Z and first electrode 111A may then be deposited upon a top surface of intermediate insulator layer 108B and subsequently covered with top insulator layer 108A. Other manufacturing methods may be employed in other embodiments. In some examples, top insulator layer 108A may be omitted.

As depicted in FIG. 26, as well as in FIGS. 27-30 discussed below, transition electrode 2614 may be centered within transition region 122 midway between last electrode 110Z and first electrode 111A. In other embodiments, however, transition electrode 2614 may be located at other lateral positions relative to last electrode 110Z and first electrode 111A.

In operating LC GRIN lens structure 2600, as well as other LC GRIN lens structures disclosed in FIGS. 27-30, a voltage may be applied to transition electrode 2614 relative to common electrode 102 to efficiently reorient liquid crystals 115 of LC layer 105 from a spatial perspective that may result in a reduced size for transition region 122. In some embodiments, the voltage applied to transition electrode 2614 may be equal to the voltage of last electrode 110Z of first region 120 or the voltage of first electrode 111A of second region 121. For example, the voltage applied to transition electrode 2614 may be equal to the lower of the voltage of last electrode 110Z and the voltage of first electrode 111A. In applying such a voltage to transition electrode 2614, the electric field within transition region 122 may be enhanced or strengthened so that a narrow transition region 122 between first region 120 and second region 121 may result. Other voltage levels for transition electrode 2614, such as between the voltages of last electrode 110Z and first electrode 111A, are also possible in some examples. In other cases, the voltage applied to transition electrode 2614 may be less than the lower of the voltages of last electrode 110Z and first electrode 111A. In other examples, the voltage applied to transition electrode 2614 may be higher than the larger of the voltages of last electrode 110Z and first electrode 111A. In some embodiments, an optimum voltage to be applied to transition electrode 2614 may depend on the specific voltages applied to last electrode 110Z and first electrode 111A, as well as potentially the specific material properties of liquid crystals 115 used in LC layer 105.

Figure 27:
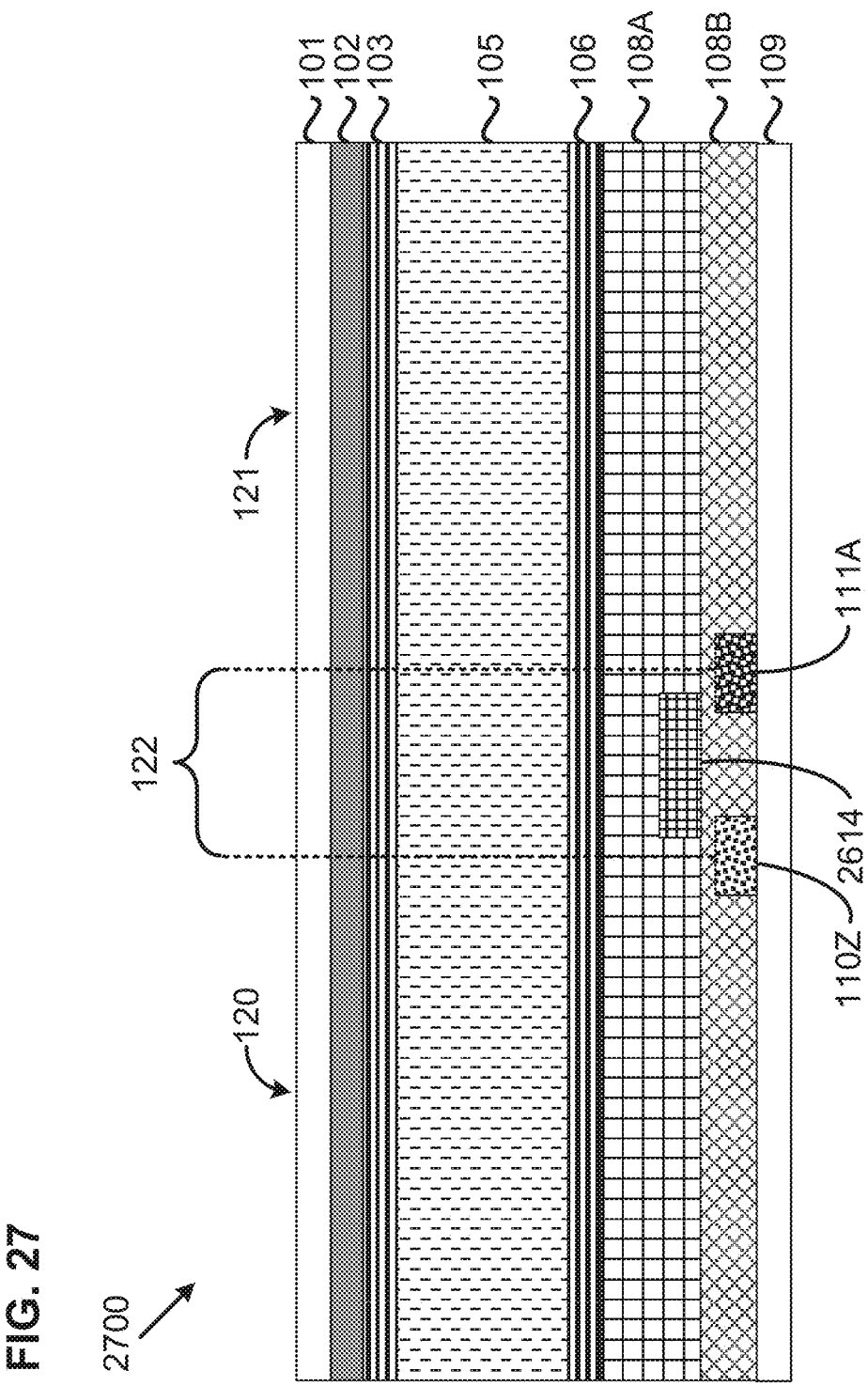

FIG. 27 is a cross-sectional view of an LC GRIN lens structure 2700 based on the configuration of LC GRIN lens structure 2600 of FIG. 26, but with transition electrode 2614 located between and above last electrode 110Z of first region 120 and first electrode 111A of second region 121. In some embodiments, voltage may be applied to transition electrode 2614 as discussed above in conjunction with FIG. 26 to reduce the size of transition region 122. In some embodiments, last electrode 110Z and first electrode 111A may be deposited on bottom substrate 109 and encased with intermediate insulator layer 108B. Transition electrode 2614 may then be deposited upon a top surface of intermediate insulator layer 108B and subsequently covered with top insulator layer 108A. Other manufacturing methods may be employed in other embodiments. In some examples, top insulator layer 108A may be omitted, as indicated above in conjunction with FIG. 26.

Figure 28:
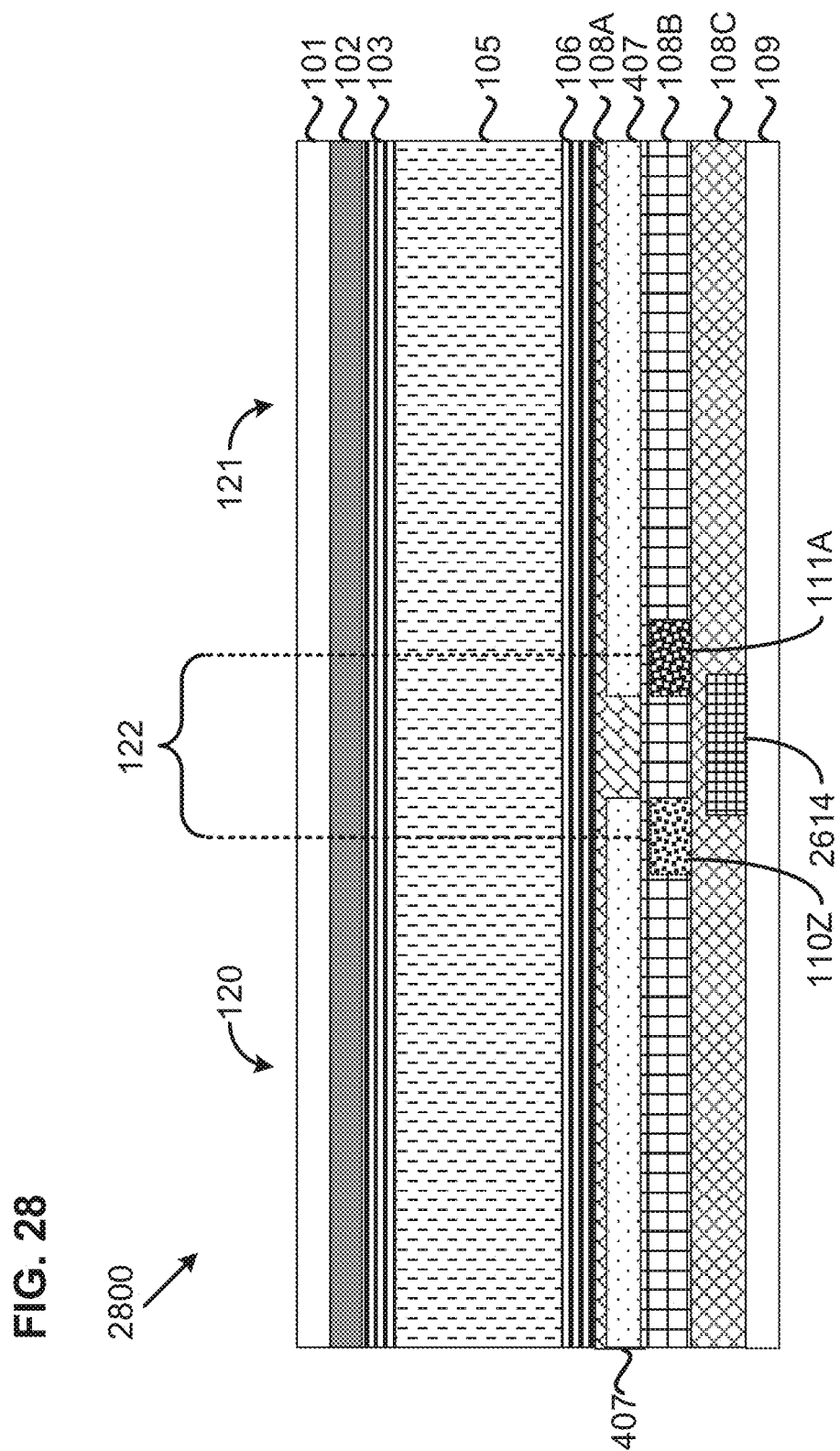

FIG. 28 is a cross-sectional view of an LC GRIN lens structure 2800 that enhances LC GRIN lens structure 400 of FIG. 4 and LC GRIN lens structure 500 of FIG. 5 with transition electrode 2614. In this example, transition electrode 2614 is located below and midway between last electrode 110Z of first region 120 and first electrode 111A of second region 121, each of which is located below high-resistance layer 407 (e.g., at a gap defined in high-resistance layer 407 in transition region 122). In some embodiments, voltage may be applied to transition electrode 2614 as discussed above in conjunction with FIG. 26 to enable narrowing of transition region 122.

In one example, transition electrode 2614 may be deposited on bottom substrate 109 and encased with bottom insulator layer 108C. Last electrode 110Z and first electrode 111A may then be deposited upon a top surface of bottom insulator layer 108C and subsequently covered with intermediate insulator layer 108B. Thereafter, high-resistance layer 407 may be deposited upon a top surface of intermediate insulator layer 108B and covered with top insulator layer 108A. Other manufacturing methods may be employed in other embodiments. In some examples, either or both top insulator layer 108A and intermediate insulator layer 108B may be omitted.

Figure 29:
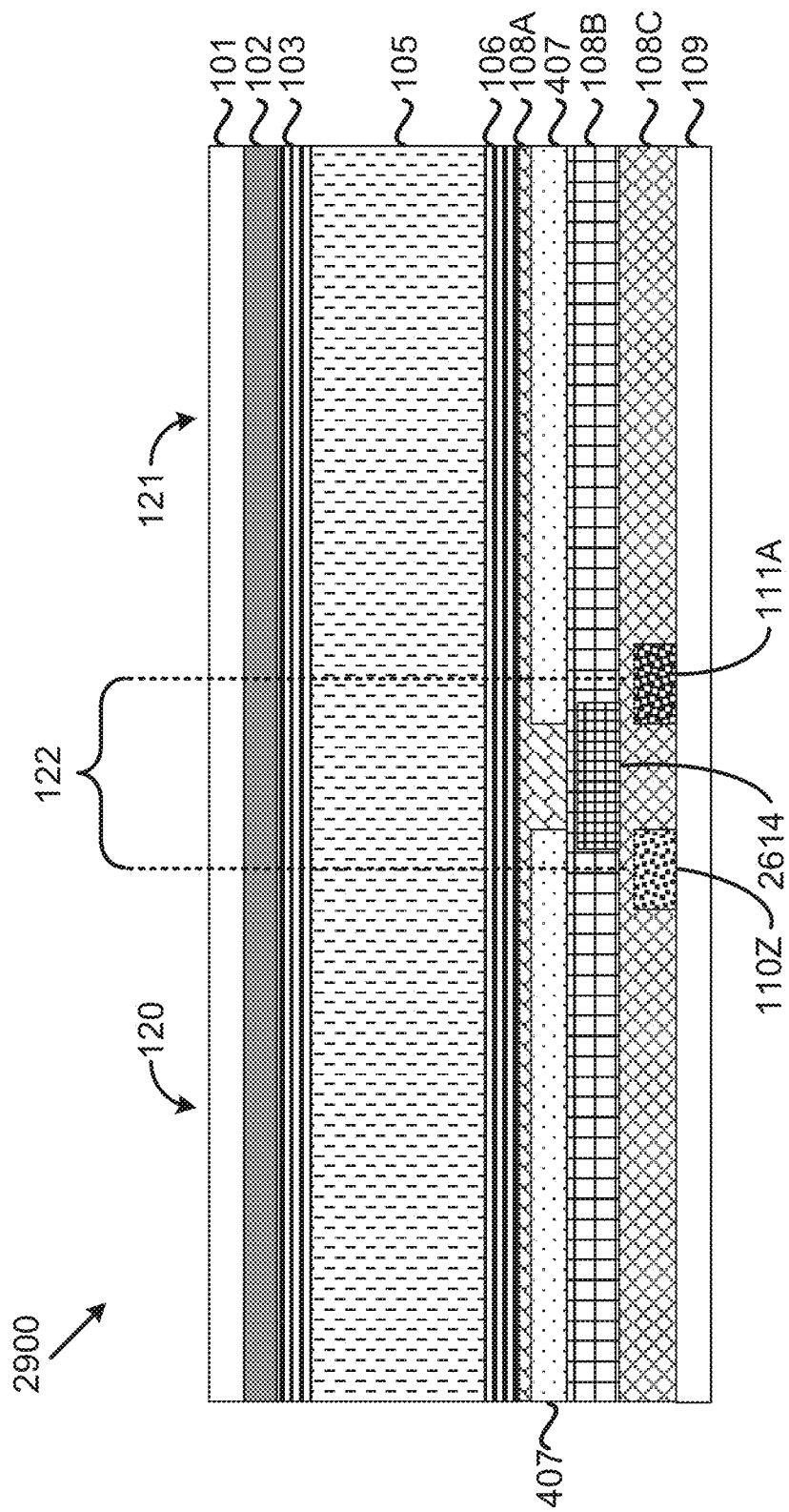

FIG. 29 is a cross-sectional view of an LC GRIN lens structure 2900 that may also enhance LC GRIN lens structure 400 of FIG. 4 and LC GRIN lens structure 500 of FIG. 5 with transition electrode 2614. In this case, transition electrode 2614 is located above and midway between last electrode 110Z of first region 120 and first electrode 111A of second region 121, each of which is located below high-resistance layer 407 (e.g., at a gap defined in high-resistance layer 407 in transition region 122). In some examples, voltage may be applied to transition electrode 2614 as discussed above to cause narrowing of transition region 122.

In one example, last electrode 110Z and first electrode 111A may be deposited on bottom substrate 109 and encased with bottom insulator layer 108C. Transition electrode 2614 may then be deposited upon a top surface of bottom insulator layer 108C and subsequently covered with intermediate insulator layer 108B. Thereafter, high-resistance layer 407 may be deposited upon a top surface of intermediate insulator layer 108B and covered with top insulator layer 108A. Other manufacturing methods may be employed in other embodiments. In some examples, top insulator layer 108A may be omitted.

FIG. 30 is a cross-sectional view of an LC GRIN lens structure 3000 that may also enhance LC GRIN lens structure 400 of FIG. 4 and LC GRIN lens structure 500 of FIG. 5 with transition electrode 2614. In this case, transition electrode 2614 is located above high-resistance layer 407 (e.g., at a gap defined in high-resistance layer 407 in transition region 122), which, in turn, is located above last electrode 110Z of first region 120 and first electrode 111A of second region 121, as described above in connection with FIGS. 4 and 5. In some embodiments, voltage may be applied to transition electrode 2614 as discussed above to enable narrowing of transition region 122.

In one example, last electrode 110Z and first electrode 111A may be deposited on bottom substrate 109 and encased with bottom insulator layer 108C. High-resistance layer 407 may then be deposited upon a top surface of bottom insulator layer 108C and subsequently covered with intermediate insulator layer 108B. Thereafter, transition electrode 2614 may be deposited upon a top surface of intermediate insulator layer 108B and covered with top insulator layer 108A. Other manufacturing methods may be employed in other embodiments. In some examples, either or both top insulator layer 108A and bottom insulator layer 108C may be omitted.

In some embodiments, a combination of the above-described LC GRIN lens structures (e.g., including a polymer wall, or including a supplemental electrode) may be used to efficiently reduce the size of transition regions. For example, FIG. 31 is a cross-sectional view of a portion of an LC GRIN lens structure 3100 based on the configuration of LC GRIN lens structure 2600 of FIG. 26 including transition electrode 2614, where polymer wall 604 is added within LC layer 105, in a manner similar to that shown in FIGS. 9 and 10. In some embodiments, by employing both polymer wall 604 and transition electrode 2614 simultaneously, the additional support for proper realignment of liquid crystals 115 may result in further narrowing of transition region 122. While FIG. 31 represents a single embodiment employing both polymer wall 604 and transition electrode 2614, other embodiments of transition electrode 2614 shown in FIGS. 27-30 may be combined with polymer wall 604 (e.g., as generally illustrated in FIGS. 6-10) in a similar manner. Additionally, other embodiments of transition electrode 2614, as depicted in FIGS. 26-30, may employ polymer walls 1104, 1604, or 2104 (e.g., as generally shown in FIGS. 11-25 and described above) to similar effect.

In some implementations of the present disclosure, an electrical structure (e.g., a transition electrode) and/or a non-electrical structure (e.g., a polymer wall) may be employed within a transition region between neighboring operational regions of an LC GRIN lens structure. Such implementations may efficiently realign liquid crystals in the transition region, thus facilitating a reduction in size of the transition region. Such a size reduction may correlate with a reduced overall area of the lens structure being consumed with transition regions, thus increasing the optical performance of the overall lens structure.

With reference to any embodiment disclosed herein, top LC alignment layer 103 and bottom LC alignment layer 106 may promote substantially planar LC alignment (i.e., the LC pretilt is in the range $0°≤θ≤15°$. When $θ=0°$, the LC director is in the plane of the first and/or second electrode substrate. Alternatively, top LC alignment layer 103 and second LC alignment layer 106 may promote substantially vertical LC alignment (i.e., the LC pretilt is in the range $75°≤θ≤90°$). When $θ=90°$, the LC director is perpendicular to the plane of the first and/or second electrode substrate.

With reference to any embodiment described herein, LC layer 105 may be comprised of an LC material that has either a positive dielectric anisotropy (i.e., $+Δε$) or a negative dielectric anisotropy (i.e., $-Δε$).

With reference to any embodiment disclosed herein, the alignment direction of a first LC alignment layer may be configured in an anti-parallel orientation (i.e., 180°) with respect to the alignment direction of a second LC alignment layer. Alternatively, the alignment direction of the first LC alignment layer may be configured in a perpendicular (90°) orientation with respect to the alignment direction of the second LC alignment layer. (As used herein, either top LC alignment layer 103 or bottom LC alignment layer 106 may be the first LC alignment layer or the second LC alignment layer.) Planar anti-parallel LC alignment may be considered a type of ECB (Electrically Controlled Birefringence) LC mode. Planar perpendicular LC alignment may be considered a type of TN (Twisted Nematic) LC mode. Vertical anti-parallel LC alignment may be considered a type of VAN (Vertically Aligned Nematic) LC mode. Vertical perpendicular LC alignment may be considered a type of TVAN (Twisted Vertically Aligned Nematic) LC mode. LC GRIN lens structures disclosed herein may be configured with LC alignment layers such that a type of ECB, TN, VAN or TVAN LC GRIN lens structure is realized.

With reference to any embodiment disclosed herein, the LC GRIN lens structure may be used to image linearly polarized light. In other words, linearly polarized light that emanates from an object is subsequently imaged by the LC GRIN lens structure. The light that enters the LC GRIN lens structure from the object may be termed "input light". The light that exits the LC GRIN lens structure that originally emanated from the object may be termed "output light". The input light may be linearly polarised (i.e., the light emanating from the object may be intrinsically linearly polarized, or a linear polarizer may be disposed between the LC lens structure and the object). The electric field vector of the linearly polarised input light may be configured in a parallel orientation (i.e., 0°) with respect to the alignment direction of the first LC alignment layer and/or the second LC alignment layer. The output light may pass through a linear polarizer that is known as the analyser. Although the analyser may reduce the brightness of an image formed by the LC GRIN lens structure, the analyser may improve the image quality formed by the LC GRIN lens structure. The transmission axis of the analyser may be configured in a parallel orientation (i.e., 0°) with respect to the alignment direction of the first LC alignment layer and/or the second LC alignment layer. Alternatively, the transmission axis of the analyser may be configured in a perpendicular orientation (i.e., 90°) with respect to the alignment direction of the first LC alignment layer and/or the second LC alignment layer. The first LC alignment layer encountered within the LC GRIN lens structure by the input light may be either the first LC alignment layer of the LC GRIN lens structure or the second LC alignment layer of the LC GRIN lens structure. Likewise, the second LC alignment layer encountered within the LC GRIN lens structure by the input light may be either the first LC alignment layer of the LC GRIN lens structure or the second LC alignment layer of the LC GRIN lens structure.

FIG. 32 is a partial cross-sectional view of an electrically controlled birefringence (ECB) LC GRIN lens structure 3200 that may be used to image linearly polarized input light 3290. In other words, linearly polarized light 3290 that emanates from an object (not shown in FIG. 32) may be subsequently imaged by LC GRIN lens structure 3200. Aspects of FIG. 32 may be combined with other embodiments disclosed herein (specifically, embodiments relating to FIGS. 6 through 31, inclusive). The alignment direction of top LC alignment layer 103 and the alignment direction of bottom LC alignment layer 106 are arranged in an anti-parallel orientation as indicated by the conventional symbols on the respective LC alignment layers 103 and 106. Input light 3290 is linearly polarized parallel to the alignment direction of both top LC alignment layer 103 and bottom LC alignment layer 106. A polarisation direction 3291 (i.e., the electric field vector) of input light 3290 is shown by the double-headed arrow. A transmission axis 3293 of analyser 3292 is oriented to be parallel to polarisation direction 3291 of linearly polarized input light 3290. The LC materials of LC layer 105 have positive dielectric anisotropy. All other layers pertaining to LC GRIN lens structure 3200 (common electrode 102, electrodes 110 and 111, top substrate 101, bottom substrate 109, and so on) have been omitted for clarity. The top LC alignment layer 103 may be the first LC alignment layer or the second LC alignment layer. The bottom LC alignment layer 106 may be the first LC alignment layer or the second LC alignment layer.

FIG. 33 is a partial cross-sectional view of a twisted nematic (TN) LC GRIN lens structure 3300 that may be used to image linearly polarized input light 3290. Aspects of FIG. 33 may be combined with other embodiments disclosed herein (specifically, embodiments relating to FIGS. 6 through 31, inclusive). The alignment direction of top LC alignment layer 103 and the alignment direction of bottom LC alignment layer 106 are arranged in a perpendicular orientation as indicated by the conventional symbols on the respective LC alignment layers 103 and 106. Input light 3290 is linearly polarized along polarization direction 3291 parallel to the alignment direction of bottom LC alignment layer 106. A transmission axis 3294 of analyser 3292 is oriented perpendicular to polarisation direction 3291 of linearly polarized input light 3290 and parallel to the alignment direction of top LC alignment layer 103. All other layers pertaining to LC GRIN lens structure 3300 (common electrode 102, electrodes 110 and 111, top substrate 101, bottom substrate 109, and so on) have been omitted for clarity.

From the above discussion, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A liquid crystal (LC) lens structure, comprising:
a first electrode substrate;
a second electrode substrate disposed over the first electrode substrate; and
an LC layer disposed between the first electrode substrate and the second electrode substrate;
wherein:
the LC lens structure comprises a first lens region and a second lens region separated from the first lens region by an intermediate region;
the second electrode substrate comprises a top substrate, a transparent conductive layer and a first LC alignment layer;
the first electrode substrate comprises a bottom substrate, a second LC alignment layer, and an electrode layer comprising a plurality of electrodes;
the plurality of electrodes are separated into two or more separately addressed electrodes for each of the first lens region and the second lens region;
the LC layer, in the intermediate region, further comprises a polymer wall extending from at least one of the first LC alignment layer and the second LC alignment layer; and
a height of the polymer wall is less than a height of the LC layer and is in contact with the second electrode substrate.

2. The LC lens structure of claim 1, wherein a width of the polymer wall is less than a distance between a final electrode of the plurality of electrodes in the first lens region closest to the intermediate region and an initial electrode of the plurality of electrodes in the second lens region closest to the intermediate region.

3. The LC lens structure of claim 1, wherein a width of the polymer wall is greater than a distance between a final electrode of the plurality of electrodes in the first lens region closest to the intermediate region and an initial electrode of the plurality of electrodes in the second lens region closest to the intermediate region.

4. The LC lens structure of claim 1, wherein the polymer wall is positioned equidistant from a final electrode of the plurality of electrodes in the first lens region closest to the intermediate region to an initial electrode of the plurality of electrodes in the second lens region closest to the intermediate region.

5. The LC lens structure of claim 1, wherein the polymer wall is offset from a midpoint of a distance between a final electrode of the plurality of electrodes in the first lens region closest to the intermediate region and an initial electrode of the plurality of electrodes in the second lens region closest to the intermediate region.

6. The LC lens structure of claim 1, wherein the polymer wall has a symmetric shape.

7. The LC lens structure of claim 1, wherein the polymer wall has an asymmetric shape.

8. The LC lens structure of claim 1, wherein the polymer wall is optically isotropic.

9. The LC lens structure of claim 1, wherein the polymer wall is optically birefringent.

10. The LC lens structure of claim 1, wherein the first electrode substrate further comprises:
   an insulation layer; and
   a high resistance layer disposed between the insulation layer and the LC layer, wherein the insulation layer isolates the high resistance layer from the plurality of electrodes, and wherein the high resistance layer is patterned such that a first portion of the high resistance layer in the first lens region is electrically separated from a second portion of the high resistance layer in the second lens region.

11. The LC lens structure of claim 10, wherein the high resistance layer is patterned such that a width of a gap between the first portion of the high resistance layer and the second portion of the high resistance layer is greater than a width of the polymer wall.

12. The LC lens structure of claim 10, wherein the high resistance layer is patterned such that a width of a gap between the first portion of the high resistance layer and the second portion of the high resistance layer is equal to a width of the polymer wall.

13. The LC lens structure of claim 10, wherein the high resistance layer is patterned such that a width of a gap between the first portion of the high resistance layer and the second portion of the high resistance layer is less than a width of the polymer wall.

14. The LC lens structure of claim 1, wherein the first LC alignment layer and the second LC alignment layer are configured to facilitate an LC mode selected from a group consisting of:
   an electrically controlled birefringence (ECB) LC mode;
   a twisted nematic (TN) LC mode;
   a vertically aligned nematic (VAN) LC mode; and
   a twisted vertically aligned nematic (VAN) LC mode.

15. A liquid crystal (LC) lens structure, comprising:
   a first electrode substrate;
   a second electrode substrate disposed over the first electrode substrate; and
   an LC layer disposed between the first electrode substrate and the second electrode substrate;
   wherein:
      the LC lens structure comprises a first lens region and a second lens region separated from the first lens region by an intermediate region;
      the second electrode substrate comprises a top substrate, a transparent conductive layer and a first LC alignment layer;
      the first electrode substrate comprises a bottom substrate, a second LC alignment layer, and an electrode layer comprising a plurality of electrodes;
      the plurality of electrodes are separated into two or more separately addressed electrodes for each of the first lens region and the second lens region;
      the LC layer, in the intermediate region, further comprises a polymer wall extending from at least one of the first LC alignment layer and the second LC alignment layer;
      the plurality of electrodes are apportioned to a lower layer and an upper layer disposed between the LC layer and the lower layer;
      the first electrode substrate further comprises an insulation layer separating the lower layer and the upper layer;
      the plurality of electrodes are positioned such that electrodes immediately neighboring each electrode in the upper layer reside in the lower layer; and
      the plurality of electrodes are sized such that each electrode in the upper layer overlaps each immediately neighboring electrode in the lower layer.

* * * * *